(12) United States Patent
Zweben et al.

(10) Patent No.: US 6,216,109 B1
(45) Date of Patent: Apr. 10, 2001

(54) ITERATIVE REPAIR OPTIMIZATION WITH PARTICULAR APPLICATION TO SCHEDULING FOR INTEGRATED CAPACITY AND INVENTORY PLANNING

(75) Inventors: Monte Zweben, San Francisco; Michael J. Deale, Sunnyvale; Eugene D. Davis, Foster City; Brian L. Daun, Mountain View, all of CA (US)

(73) Assignee: PeopleSoft, Inc., Pleasanton, CA (US)

( * ) Notice: Subject to any disclaimer, the term of this patent is extended or adjusted under 35 U.S.C. 154(b) by 0 days.

(21) Appl. No.: 08/948,375

(22) Filed: Oct. 9, 1997

Related U.S. Application Data

(63) Continuation of application No. 08/321,603, filed on Oct. 11, 1994, now abandoned.

(51) Int. Cl.[7] .................................................. G06F 153/00
(52) U.S. Cl. .................................................................. 705/8
(58) Field of Search ................................ 705/4, 6, 7–10; 364/468.05, 468.06–468.09

(56) References Cited

U.S. PATENT DOCUMENTS

| | | |
|---|---|---|
| 4,495,559 | 1/1985 | Gelatt, Jr. et al. . |
| 4,864,507 | 9/1989 | Ebling et al. ............... 364/149 |
| 4,874,963 | 10/1989 | Alspector ..................... 307/201 |
| 4,931,944 | 6/1990 | Richter et al. ............... 364/468 |
| 5,237,497 | 8/1993 | Sitarski ........................ 364/402 |
| 5,255,345 | 10/1993 | Shaefer ........................ 395/13 |
| 5,303,328 | 4/1994 | Masui et al. ................. 395/23 |
| 5,319,781 * | 6/1994 | Syswerda ..................... 395/650 |
| 5,353,229 * | 10/1994 | Tanaka ........................ 364/468 |

OTHER PUBLICATIONS

"Learning to Improve Constraint–Based Scheduling", by Monte Zweben et al., Artificial Intelligence 58 (1992), pp. 271–296.

"Scheduling and Rescheduling with Iterative", by Monte Zweben et al., IEEE Transactions on Systems, Man. and Cybernetics, vol. 23, No. 6, Nov./Dec. 1993.

*Intelligent Scheduling*, by Monte Zweben et al., pp. 241–255, 423–449, Morgan Kaufman Publishers, 1994.

"Heuristics versus Lookahead in Iterative Repair Scheduling", by Monte Zweben et al., IEEE Transactions on Systems Man. & Cybernetics, Nov./Dec. 1993, vol. 23, No. 6.

* cited by examiner

*Primary Examiner*—Frantzy Poinvil
(74) *Attorney, Agent, or Firm*—David R. Graham

(57) ABSTRACT

A schedule for a complex activity is obtained by a scheduling system using a method of constraint-based iterative repair. A predetermined initial schedule is iteratively repaired, repairs being made during each iteration only to portions of the schedule that produce a constraint violation, until an acceptable schedule is obtained. Since repairs are made to the schedule only to repair violated constraints, rather than to the entire schedule, schedule perturbations are minimized, thereby reducing problems with the dynamic performance of the scheduling system and minimizing disruption to the smooth operation of the activity. All constraints on the scheduling activity can be evaluated simultaneously to produce a solution that is near optimal with respect to all constraints. In particular, consumable resource constraints can be evaluated simultaneously with other constraints such as, for example, reusable resource constraints, temporal constraints, state constraints, milestone constraints and preemptive constraints. The scheduling system of the invention is much quicker than previous scheduling systems that use, for example, constructive scheduling method. The system of the invention can also be easily modified to add, delete or modify constraints. Because of the minimization of schedule perturbation, coupling of all constraints, speed of operation, and ease of modification, the scheduling system of the invention is particularly useful for scheduling applications that require frequent and rapid rescheduling.

20 Claims, 7 Drawing Sheets

ITERATIVE REPAIR OPTIMIZATION WITH PARTICULAR APPLICATION TO SCHEDULING FOR INTEGRATED CAPACITY AND INVENTORY PLANNING

CROSS-REFERENCE TO RELATED APPLICATION

This application is a continuation application of U.S. patent application Ser. No. 08/321,603, filed Oct. 11, 1994, now abandoned.

BACKGROUND OF THE INVENTION

1. Field of the Invention

This invention relates to a system and method for scheduling a complex activity that includes performance of a multiplicity of tasks, the completion of which necessitates the use of a multiplicity of resources and adherence to state requirements of a multiplicity of attributes. The tasks, resources and attributes are related by a multiplicity of constraints. At least some of the resources are consumable resources. In particular, the invention relates to such a system and method that combine the techniques of constraint-based iterative repair with the techniques of material requirements planning.

2. Related Art

Management of a complex activity, such as operation of a manufacturing facility, or maintenance and repair of a complex system such as the Space Shuttle, necessitates scheduling of many tasks, the completion of which may conflict with each other for a variety of reasons. Further, each of the tasks uses resources (which can be either consumable or reusable) of finite extent. Development of a schedule that resolves the many possible conflicts that may arise during conduct of the activity is a complex problem. The problem is further compounded by the probability that unforeseen events will, from time to time, necessitate modification of any determined schedule.

"Scheduling" is the process of assigning times and resources to the tasks of an operation. Scheduling assignments must satisfy a set of constraints. Constraints include, for example, temporal constraints, milestone constraints, resource constraints, state constraints and preemptive constraints.

Constructive scheduling is one method that has been used to develop schedules for complex activities. In constructive scheduling, a partial schedule is developed from scratch so that the partial schedule does not violate any of the constraints (or violates the constraints to a predefined acceptable degree). The partial schedule is then incrementally extended through a series of successive partial schedules, each successive partial schedule conforming to the constraints (again, to a predefined degree), until a final, complete schedule is developed. In some constructive scheduling methods, failure of any of the partial schedules to adequately satisfy the constraints necessitates backtracking to an earlier partial schedule and reconstructing a series of partial schedules from that point. Construction of partial schedules and backtracking continue until an acceptable final schedule is developed. In other constructive scheduling methods, when a partial schedule fails to satisfy a constraint, the schedule meets the constraint as best it can, and the constraint is relaxed to the degree necessary to eliminate the constraint violation.

Constraint-based iterative repair is another method that has been used to develop schedules for complex activities. In constraint-based iterative repair, a complete schedule that does not adequately satisfy the constraints is iteratively modified to obtain a series of complete schedules until one of the modified schedules adequately satisfies the constraints. Unlike constructive methods, only constraints that have been violated are repaired during each iteration.

The above-described techniques have been used to solve "scheduling problems." A "scheduling problem" is a problem in which all of the items, e.g., tasks and resources, to be scheduled to accomplish an operation are known at the beginning of development of the schedule. Establishment of a schedule consists of assigning a time and allocating resources to each task such that the constraints are satisfied to the degree desired. An example of a scheduling problem is the assignment of classrooms, teachers and students for all of the courses offered at a university during a semester.

In contrast to a scheduling problem, with its pre-established set of tasks and resources, a "planning problem" is more open-ended. In a planning problem, any of a number of sets of tasks and resources can be chosen to accomplish an operation, subject only to the satisfaction of certain conditions during the scheduled set of activities. Thus, typically, while scheduling for a planning problem will begin with a defined set of tasks and resources, additional tasks and resources are added to the schedule as the final schedule is developed. (It is also possible to delete some tasks and resources during development of the final schedule.) Therefore, scheduling for "planning problems" is generally more complex than scheduling for "scheduling problems." Scheduling a manufacturing operation is a good example of a planning problem.

There are two primary types of planning problems: i) consumable resource planning, e.g., inventory planning such as planning for finished goods, raw material, and/or work-in-progress in a manufacturing operation, and ii) reusable resource planning, e.g., capacity planning such as planning for machine and labor usage in a manufacturing operation. Previously, these two planning problems have been addressed separately. Below, previous methods of addressing these problems are discussed in the manufacturing context.

In manufacturing, master production scheduling (MPS) has been used to address the inventory planning problem. MPS operates at a macrocosmic level and is used to develop a build schedule for the supply of finished goods, e.g., goods sold directly to a consumer. MPS accepts demand requirements as input, i.e., the quantity of finished goods needed at particular times. The demand requirements are forecasted and/or actual needs netted against existing inventory. MPS develops a schedule for the replenishment of the finished goods inventory by scheduling the production and/or procurement of batches of finished goods to meet the demand requirements. For example, MPS could be used to develop a build schedule for a particular model of computer made by a manufacturer.

Rough cut capacity planning has been used in the manufacturing context to address the capacity planning problem at the macrocosmic level. Typically, rough cut capacity planning evaluates capacity constraints at some level between the factory and machine levels, e.g., at the production line level. A build schedule, as developed by a MPS system for example, is input into the rough cut capacity planning system and a determination is made as to whether sufficient resources exist to implement the build schedule. If not, a planner must either direct that additional capacity be added, or develop a new build schedule using MPS techniques. For example, rough cut capacity planning can determine whether there are an adequate number of assembly lines and workers to produce a sufficient number of computers according to a build schedule established by an MPS system.

Typically, MPS and rough cut capacity scheduling are successively performed at least several times before a satisfactory build schedule is developed, one that accommodates both demand (inventory) requirements and capacity constraints. Inventory planning and capacity planning are not coupled, other than to supply the inventory planning (i.e., MPS) output as the capacity planning (i.e., rough cut capacity planning) input, and to use the capacity planning output to evaluate the efficacy of the inventory planning output. Solution of the combined inventory and capacity problem in this manner frequently takes a rather long time and does not lend itself to easy rescheduling once an acceptable build schedule has been established.

Once MPS and rough cut capacity planning have been used to develop a satisfactory build schedule for the supply of finished goods, the production requirements of the build schedule are supplied to a material requirements planning (MRP) system. MRP operates at a microcosmic level and is used to develop a schedule for the production of finished goods. As input, the MRP system accepts the production requirements of the build schedule, subassembly and raw materials inventory levels (to net production requirements against existing inventory), bills of materials (BOMs) associated with the production of the finished goods and subassemblies, and information regarding production and material ordering lead times. The MRP system outputs schedules for the ordering of raw materials and component parts, assembly of raw materials and component parts into sub-assemblies, and assembly of sub-assemblies into finished goods. MRP could be used, for example, to schedule the assembly of circuit boards and disk drives from raw materials and/or component parts, as well as the subsequent assembly of the circuit boards and disk drives (and other necessary components) to produce computers.

The schedule developed by an MRP system assumes infinite capacity. Since, in the real world, this is not so, the schedule developed by the MRP system can be input to a capacity resources planning (CRP) system to evaluate whether sufficient capacity resources are available at the times necessary to fulfill the MRP schedule. If not, then either additional capacity must be added, or the MRP system must produce a new schedule. However, like MPS and rough cut capacity planning, MRP and CRP are not coupled processes, so that development of a new schedule by the MRP system does not occur automatically, but rather must be initiated by a planner who makes changes to the demand requirements placed on the MRP system using knowledge not available to the planning systems, such as the ability of one part to be substituted for another.

Another approach used with MRP to solve the capacity problem is finite capacity scheduling (FCS). FCS systems may have a limited ability to perform some automatic rescheduling. However, they do not extensively couple capacity constraints to inventory requirements and so do not adequately optimize a schedule based upon consideration of capacity constraints. Several types of FCS have been tried, each type enabling consideration of only a small subset of schedules out of the entire realm of possible schedules that can satisfy the inventory and capacity constraints.

One type of FCS uses mathematical programming techniques, such as linear programming or integer programming (e.g., a branch and bound method), to develop an acceptable schedule. Mathematical programming techniques can ensure that the best possible schedule is found. However, evaluation of alternative schedules requires reformulation of the schedule from scratch, i.e., these techniques are constructive methods, making this approach very slow in producing the final schedule. Further, mathematical programming necessitates complex mathematical formulations and a large number of variables to define the scheduling problem, thus necessitating a large information storage capacity and a lengthy time for execution of the scheduling procedure. Thus, mathematical programming is not suitable for use in situations where frequent and rapid rescheduling is required, as is frequently the case. Additionally, linear programming requires a linear optimization function and real-valued variables, conditions that are too restrictive for many scheduling problems.

Another type of FCS, "dispatching and simulation," uses a set of rules to produce a schedule that satisfies both inventory and capacity constraints. Dispatching and simulation systems can include only very simple rules, or they can be implemented as rule-based expert systems and implement a more complex set of rules. However, this approach can only be used to produce a single solution—the method does not iterate through a series of solutions—so that the best schedule is usually not found. Further, once a scheduling problem has been defined, it is an arduous task to modify the problem definition to accommodate additions, revisions and deletions to the problem constraints, making dispatching and simulation a relatively inflexible approach to scheduling.

There are a number of other FCS methods, including case-based reasoning, genetic algorithms, and neural nets. All of these methods use some variation of iterative repair. Case-based reasoning is a method that matches a scheduling problem to a library of previously solved scheduling problems. When an analogous problem is found, the solution to that problem is repaired so as to make the solution applicable to the new problem. Since, in order to be useful, case-based reasoning methods require the acquisition of a voluminous amount of cases to be useful, they are overly time consuming. Even after training, case-based methods are typically slow because of the matching process.

Genetic algorithms and neural network algorithms are iterative repair methods that generally rely on very weak repairs such as random modifications or repairs that are analogous to biological gene mutations and crossovers. Because these algorithms have weak repairs, they typically require many iterations to converge to an acceptable schedule and, therefore, are slow. Further, since these methods rely on random repairs, they also tend to significantly alter schedules, making them undesirable for rescheduling applications. Standard applications of simulated annealing and tabu search also rely on random repairs rather than the exploitation of constraint knowledge, so they also suffer from the same problems—slowness and large schedule perturbation—as genetic and neural network algorithms.

None of the above-described approaches considers both inventory and capacity constraints simultaneously to a significant degree, and most do not consider the two together at all. As a result, those methods typically do not produce a schedule that is optimal with respect to both capacity and inventory constraints.

Further, those methods that do consider inventory and capacity together to a limited degree (FCS methods), suffer from other deficiencies. Integer programming requires complex modeling and is slow. Dispatching and simulation, and rule-based expert systems do not iterate through a series of solutions in order to obtain increasingly better solutions and are difficult to modify to change constraint definitions.

Additionally, all of the above-described methods produce revised schedules by reworking all or a large part of the schedule without regard for the extent of the changes between the old and new schedules. In other words, these methods do not attempt to minimize scheduling perturbations when a schedule must be revised. Such extensive scheduling changes can be disruptive to the smooth operation of a complex activity. Further, reworking the entire schedule causes these methods to take an undesirably long time to produce a schedule. Thus, none of the above-described methods work well for frequent rescheduling of a complex activity. Since, in the real world, rescheduling must typically be done often to respond to changing conditions, a better scheduling approach is needed, one that integrates the resolution of capacity and inventory constraints, that minimizes the disturbances caused by rescheduling and that produces a revised schedule quickly. Further, such a system should be easily modified to accommodate changes in constraint definition.

SUMMARY OF THE INVENTION

According to the invention, a schedule for a complex activity that uses consumable resources is obtained by constraint-based iterative repair. A predetermined initial schedule is iteratively repaired, repairs being made during each iteration only to portions of the schedule that produce a constraint violation, until a final schedule is obtained. Both consumable resource (inventory) constraints and reusable (capacity) resource constraints can be satisfied simultaneously.

A method according to one embodiment of the invention includes the steps of: i) establishing an unacceptable initial schedule as a current schedule; ii) calculating a score for the current schedule; iii) repairing one or more of the constraint violations of the current schedule; iv) determining a revised schedule from the schedule modification or modifications made by the constraint violation repair or repairs; v) calculating a score for the revised schedule; vi) selecting one of the revised schedule or the current schedule as the new current schedule; vii) repeating the steps of repairing one or more of the constraint violations of the current schedule, determining a revised schedule, calculating a score for the revised schedule, and selecting one of the revised schedule or the current schedule as the new current schedule; and viii) selecting one of the revised schedules as the final schedule. The step of repeating is performed until a predetermined condition is met. For example, the predetermined condition can be that the score of the new current schedule is better than a pre-established threshold score, that a metric time limit has been reached since the start of the method, or that a predetermined number of iterations (i.e., number of times of performing the step of repeating) have taken place since the start of the method. These possibilities are merely illustrative, not exhaustive.

The score for each schedule is calculated as a function of the relative importance of each constraint (weight) and the degree of violation of each constraint (penalty). The selection of the revised schedule or the current schedule as the new current schedule is based upon a comparison of the score of the revised schedule and the score of the current schedule. In a further embodiment, the schedule that has the better score is selected as the new current schedule. In another further embodiment, the schedule that has the worse score is occasionally selected as the new current schedule.

A system according to one embodiment of the invention includes a memory device and a processing device. The memory device is used to store various information such as: i) an unacceptable initial schedule that is supplied to the system; ii) information regarding each of a multiplicity of constraints, the constraint information including a description of the constraint, a penalty function, a constraint weight, and a repair method for the constraint; and iii) one or more revised schedules produced by the system. The processing device is used to process the stored information in various ways such as: i) calculating a score for each schedule as a function of the relative importance of each constraint and the degree of violation of each constraint caused by the schedule; ii) repairing one or more of the constraint violations for each schedule using the repair method associated with the constraint; iii) determining each revised schedule using the constraint violation repairs from a previous schedule; iv) selecting one of the revised schedule or the current schedule as the new current schedule based upon a comparison of the score of the revised schedule and the score of the current schedule; and v) selecting one of the revised schedules as the final schedule determined by the system. The scoring of each schedule and determination of the final schedule are done as described above for the method according to the invention. In a further embodiment, the system also includes a user input device. In another further embodiment, the system also includes a display device.

The system and method according to the invention can resolve consumable resource (inventory) constraints and reusable resource (capacity) constraints simultaneously. Further, constraints are simultaneously resolved at all levels of a scheduling hierarchy. Thus, in the manufacturing context for example, the system and method according to the invention simultaneously accomplish all of the scheduling functions associated with the scheduling techniques discussed above: master production scheduling, rough cut capacity planning, material requirements planning (or manufacturing resource planning), capacity resource planning and finite capacity scheduling.

Because the system and method according to the invention resolve capacity and inventory constraints simultaneously, the system and method will find a more optimal solution than previous methods that included some coupling of capacity and inventory constraints, such as dispatching and simulation systems. Further, since the system and method according to the invention repair only the portions of the schedule that need repair, they are much quicker than systems that reconstruct a large portion of the schedule, such as finite capacity scheduling systems, and they minimize schedule perturbations.

Additionally, the system and method according to the invention use constraint-based iterative repair, providing several advantages over previously used constructive scheduling methods. For example, iterative repair is superior to constructive scheduling for use in rescheduling. To reschedule with a constructive method, a system removes tasks from the schedule to produce an incomplete schedule that does not violate the constraints (or removes all tasks from the schedule and begins rescheduling from scratch), then adds tasks to the schedule in an arrangement different than that of the previous schedule. If all tasks are rescheduled, the rescheduling process takes too long. If only some of the tasks are rescheduled, tasks that are removed may not necessarily be the best tasks to remove and reschedule. The iterative repair method solves this problem by changing the schedule only where constraint violations occur and in a manner that can vary with the nature of the violation (i.e., tasks can be rescheduled, added and/or removed).

Additionally, iterative repair is better than constructive scheduling for use with over-constrained scheduling problems, i.e., scheduling problems for which all constraints cannot possibly be resolved. For over-constrained scheduling problems, a constructive method will exhaust all possibilities before inferring that constraints must be relaxed. The user must then choose some of the constraints to be relaxed. These may not be the optimal constraints to be relaxed. Further, even after the constraints are relaxed, the constructive method must then proceed to solve the new scheduling problem. Iterative repair, on the other hand, iterates through a number of schedule solutions, generally incrementally improving the solution until the best possible solution is reached, even if a perfect solution cannot be reached because the scheduling problem is over-constrained. Though iterative repair does not necessarily find the optimal solution, in the time allotted it does find a schedule with a set of assignments that is close to an optimal solution.

Iterative repair also enables more accurate use of global constraints (e.g., limitation of the number of times that a particular machine is allowed to change configuration during a time period) and optimization criteria (e.g., minimization of the use of labor resources on weekends) to develop a schedule. Often, satisfaction of global constraints and optimization criteria can only be exactly evaluated for an entire schedule. Because iterative repair methods develop revised schedules that are complete, satisfaction of global constraints and optimization criteria can be evaluated easily and accurately for each revised schedule. In contrast, satisfaction of global constraints and optimization criteria can only be approximated for each of the successive partial schedules developed by a constructive method, making evaluation of global constraints and optimization criteria relatively complicated and of questionable accuracy.

In addition to the above advantages, the system and method according to the invention are far more flexible in allowing modifications to the model of the scheduling problem than previous systems and methods for scheduling. Additional constraints can be added to the system with little effort. It is only necessary to define a penalty function, a weight and a repair method for each new constraint. This is of great value in complex scheduling problems that model many constraints, since it is inevitable that constraints will be added, deleted and modified frequently, as the characteristics of the activity being scheduled change.

The system and method according to the invention are particularly useful in any situation where it is desired to schedule an activity subject to both consumable and reusable resource constraints. For example, the system and method can be used for factory exception management and master planning, i.e., to schedule materials (i.e., raw materials or component parts necessary for production of "higher-level" parts), resources (i.e., equipment used in production such as machines) and labor (i.e., human workers such as machine operators) used in the manufacturing of a product. The system and method can also be used for distribution center exception management and master planning, i.e., scheduling of flows of finished goods from factories to consumers, retailers or manufacturers. The system and method can, in another example, be used for enterprise-wide exception management and master planning, i.e., scheduling of activities at each of several facilities such as factories or distribution centers, as well as scheduling activities that interrelate the facilities.

DETAILED DESCRIPTION OF EMBODIMENTS OF THE INVENTION

According to the invention, a scheduling system implements a method of constraint-based iterative repair that can evaluate both consumable resource constraints and reusable resource constraints simultaneously. The scheduling system according to the invention starts with a predetermined initial schedule that is imperfect because of violation of one or more predefined constraints to an unacceptable degree. The system then produces a revised scheduled by repairing ("fixing") the schedule only where a violation has occurred. The revised schedule is evaluated for compliance with the established constraints. If the revised schedule is still unacceptable, a further revised schedule is produced, a series of revised schedules being successively determined in this manner until a schedule is produced that conforms to the constraints to an acceptable degree. In many cases, the final schedule will not violate the constraints at all.

Figure 1:
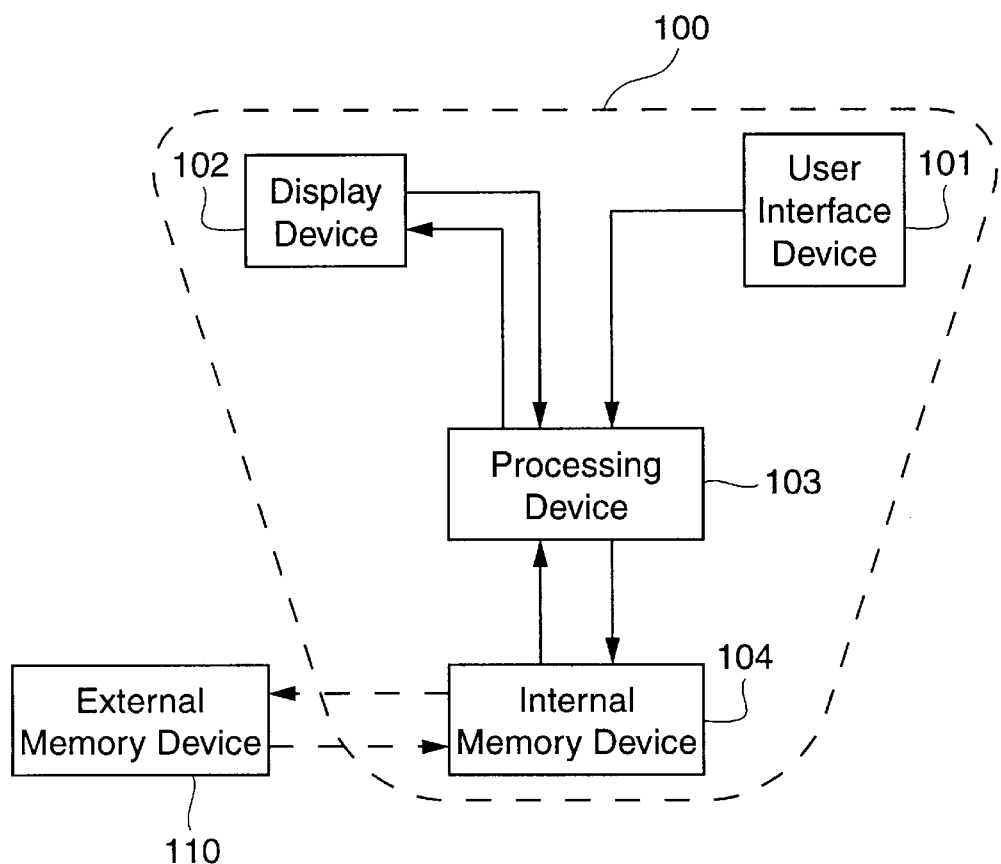
FIG. 1 is a simplified block diagram of a system according to one embodiment of the invention.

FIG. 1 is a simplified block diagram of a system 100 according to one embodiment of the invention. The system 100 includes a user interface device 101 (e.g., a keyboard or a mouse), a display device 102 (e.g., a computer display screen or a printer), a processing device 103 (e.g., a conventional microprocessor), and a memory device 104 (e.g., a magnetic disk and a random access memory). Each of the devices 101 through 104 are conventional and are widely commercially available.

The user interface device 101 enables a user to control aspects of the operation of the system 100, as will be apparent from the discussion below. For example, the interface device 101 can be used to control information input to the system 100 by, for instance, adding constraints to the system 100 or modifying aspects of existing constraints (e.g., setting the relative weights, discussed in more detail below, of the constraints) of the system 100. The interface device 101 can also be used to review in various ways the information output by the system 100. For instance, the user can display any portion of the complete temporal schedule or review the nature of constraint violations in a completed schedule (if applicable). The user can also use the interface device 101 to make manual modifications to a schedule determined by the system 100. The manually modified schedule can then be used with the modifications, or input to the system 100 for further processing.

The display device 102 displays information regarding the operation of the system 100. For instance, the display device 102 can display the respective weights (discussed in more detail below) assigned to some or all of the constraints. In one embodiment, the constraint weights are displayed together such that the relative magnitude of each of the constraint weights corresponds to the size of a graphical representation element for that constraint weight. The display device 102 can also display portions of the schedule in a variety of formats such as histograms of resource availability, Gantt charts of task schedules, or tables of various scheduling information. The display device 102 can also display a scorecard showing exceptions that represent precise points in a schedule where constraint violations occur.

The processing device 103 accepts input information provided from the memory device 104 and outputs information defining a newly developed schedule. The input information includes information regarding the current schedule to be repaired, the constraints that govern the development of each schedule, and the repairs that are used to fix constraint violations during development of a schedule. The output information includes a set of tasks, the times at which the tasks are to be performed and a set of resources required for each task.

The memory device 104 stores information used by the processing device 103 as input and information provided by the processing device 103 as output. For example, the memory device 104 stores a set of constraints, and a penalty and weight (each of which are discussed in more detail below) for each constraint. The memory device 104 also stores a set of repair methods (also discussed in more detail below) that are used to reduce or eliminate constraint violations. Each repair method is associated with one or more constraints. When a violation of a constraint occurs, the associated repair method takes an appropriate scheduling action to reduce the degree of the violation of that particular constraint. In addition to sets of constraints and constraint repairs, the memory device 104 stores information constituting both the current schedule (i.e., the schedule being repaired) and the revised schedule (i.e., the schedule that results from the repair).

The memory device 104 includes both a permanent memory (e.g., a hard drive) and a random access memory (RAM). Preferably, the memory device 104 includes a relatively large RAM, e.g., between approximately 32 megabytes and approximately 2 gigabytes. The exact memory capacity needed is a function of the complexity and magnitude of the scheduling problem. The system 100 can operate with a smaller RAM, but will have decreased operating speed.

The system 100 can be implemented on, for instance, a computer. According to one embodiment of the invention, the system 100 is implemented on a Sun Sparc workstation using the Sun Solaris operating system, both of which are sold by Sun Microsystems of Mountain View, Calif. In another embodiment, the system 100 is implemented on an HP 9000 series workstation using the HP UX operating system, both of which are sold by Hewlett Packard of Palo Alto, Calif. In still another embodiment, the system 100 is implemented on any Unix workstation using a Unix operating system, as commercially available from a number of vendors. In still another embodiment, the system 100 is implemented on any computer that uses the Windows NT or Windows (version 3.1 or higher) operating system. Generally, the system 100 is not limited to implementation on any particular computer or using any particular operating system.

As described above, the system 100 starts with an initial imperfect schedule. In the embodiment shown in FIG. 1, the initial schedule is supplied to the memory device 104 ("internal memory device") from an external memory device 110 that is not part of the system 100. The initial schedule stored on the memory device 110 can be determined in any desired manner. For example, the initial schedule could be determined using another scheduling method, e.g., a critical path method such as PERT-CPM (which schedules using only temporal constraints), a constructive method, or a manufacturing resource planning (MRPII) method.

Alternatively, the system 100 may itself determine the initial schedule, based upon information input by the user, using one of the above-described methods.

Finally, the user may input the initial schedule directly to the system 100 by using the user interface device 101. For instance, the tasks to be performed may be known and the user can input a "schedule" in which all of the tasks are started at the same time. Or, the "schedule" could be a series of forecasted sales of a product that are input to the system 100 by the user, where the sales are represented as a demand for the product at one or more times.

The initial schedule can violate the established constraints to any degree without precluding use of the method according to the invention (described below with respect to FIG. 2). Since this is so, it is desirable to obtain an initial schedule using an approach that produces the initial schedule with the least investment of resources and time. However, the greater the degree to which the initial schedule violates the constraints, the longer it may take the system 100 to produce a scheduling solution using the method according to the invention. This is particularly true as the scheduling problem becomes more complex. Thus, the selection of a method to determine an initial schedule involves a trade-off between the cost (i.e., time and resources) of the method and the quality of the initial schedule.

Figure 2:
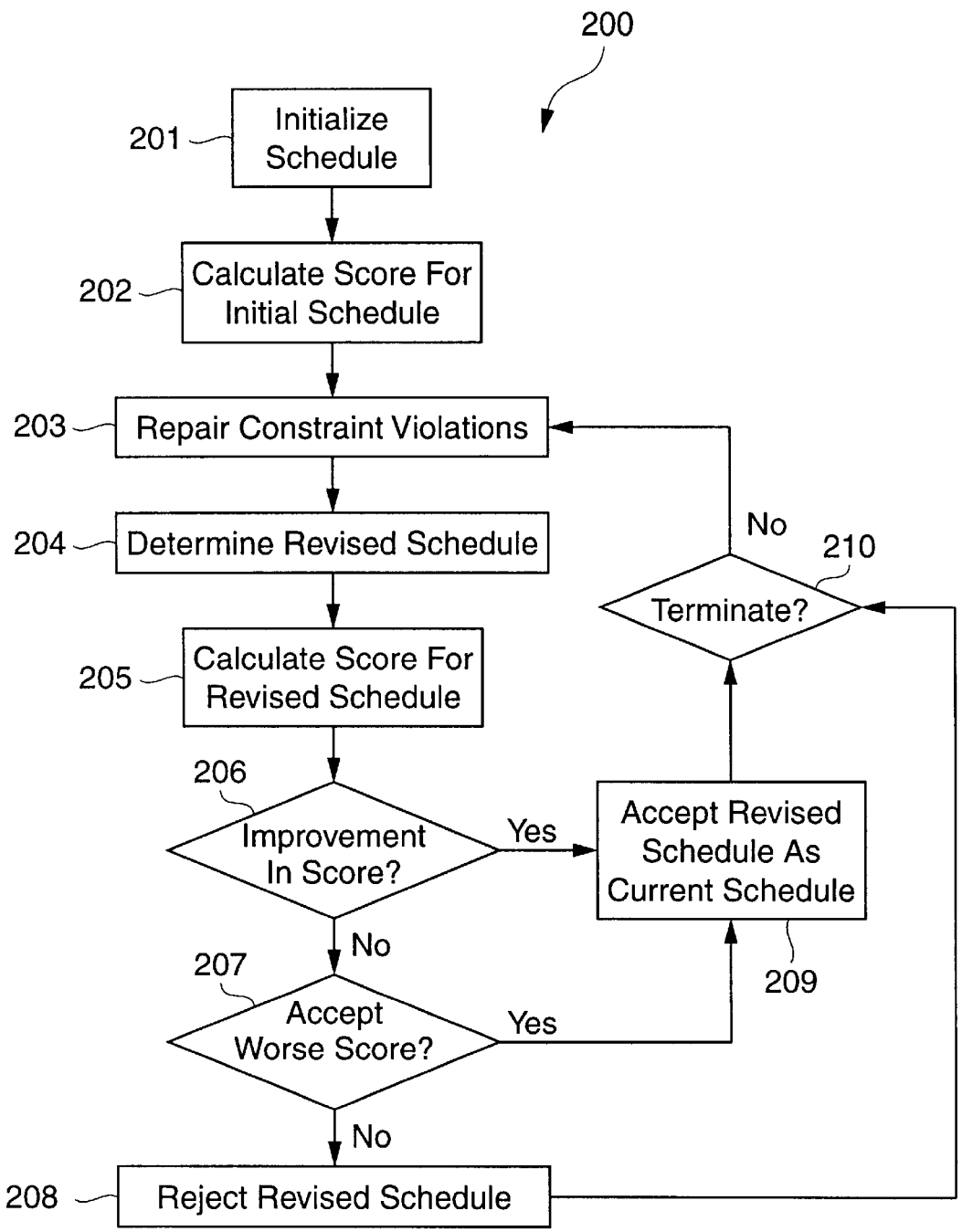
FIG. 2 is a flow chart illustrating a method, according to one embodiment of the invention, for use with the system of FIG. 1.

FIG. 2 is a flow chart illustrating a method 200, according to one embodiment of the invention, for use with the system 100 of FIG. 1. In step 201, an initial schedule is obtained, as discussed in more detail immediately above, and established as the current schedule.

In step 202, a score (or "cost") is calculated for the initial schedule. Determination of a score for a schedule is discussed in more detail below; here, it is sufficient to point out that the score for a schedule represents the degree to which the schedule violates all of the constraints taken together, i.e., how "good" the schedule is overall. The score is compared to a pre-established threshold score. The threshold score represents the degree of violation of the constraints that is deemed acceptable. The threshold score can be established so that no constraint violations are allowed. Based upon the comparison of the score to the threshold score (and certain other considerations described more fully below), the system 100 determines whether it is necessary to produce a revised schedule. This comparison, as performed for the initial schedule, is not shown as a step of the method 200. While theoretically the initial schedule can be adequate to satisfy the level of violation defined by the threshold score, in practice this will not be the case, since there would be no need for the system 100 if this occurred. However, as will be apparent from the discussion below, in general, comparison of the calculated score for each revised schedule to the threshold score is an important part of the method 200.

In step 202, as part of calculating an overall score for the schedule, the method 200 determines for each constraint, by evaluating a penalty function for the constraint (described in more detail below), whether the constraint was violated and, if so, the degree of the violation. This information is then used, as described in more detail below, to select a subset of violated constraints (which can be all or only some of the violated constraints) for repair, i.e. to be minimized or eliminated.

In step 203, each of the subset of constraint violations is repaired. Repair of a constraint violation is accomplished using a particular repair method that corresponds to the particular violated constraint. Each repair method is constructed so that the only goal of the repair method is to reduce the degree of the constraint violation being repaired. (It can, and frequently will, be the case that other constraint violations are also incidentally repaired as a result of the repair of a particular constraint violation. It is also the case that such repairs will frequently result in the introduction of new constraint violations or the worsening of existing constraint violations.) Frequently, in order to avoid large perturbations in the schedule that can prevent or delay convergence to a scheduling solution, each repair method will repair the constraint violation by only a specified amount, rather than repairing by an amount that completely eliminates the constraint violation. In general, the particular steps taken by each repair method can depend on a number of factors, as will be described in greater detail below.

In step 204, a new schedule is determined using schedule modifications made by the individual constraint repairs. In one embodiment, each of the schedule changes produced by repair of each of the subset of selected constraint violations is successively incorporated into the initial schedule to produce a revised schedule. As will be explained in greater detail below, the schedule changes can include moving tasks to a new time, deleting tasks from the schedule, or adding tasks to the schedule. If individual repairs produce conflicting schedule changes, e.g., two different repairs each want to move a task to a different time, the repair that occurs last controls the schedule change.

In step 205, an overall score is calculated for the revised schedule. A determination is made as to whether the score for the revised schedule represents an improvement over the score for the current schedule (which is, at this point, the initial schedule), as shown by step 206. If the score is an improvement, then the revised schedule is accepted as the current schedule, as shown by step 209. Further, if the score of the revised schedule is also better than the score for any previous schedule, the revised schedule is stored as the best schedule so far.

If the score is not an improvement, the revised schedule may still be accepted as the current schedule in certain cases, as shown by step 207. Determination of whether to accept a schedule having a worse score is done stochastically, using any of a number of methods. A particular method for making such a determination is discussed in more detail below. Here, it is sufficient to note that occasional acceptance of a schedule with a worse score is necessary in order for the method to avoid becoming stuck at a local minima (i.e., a scheduling solution from which all "nearby" scheduling solutions are a regression) that would otherwise prevent the method from determining an acceptable solution.

If the revised schedule has a worse score than the current schedule, as determined at step 206, and the schedule with the worse score is not accepted as the current schedule, as determined at step 207, then the revised schedule is rejected, as shown by step 208. After either rejection or acceptance of the revised schedule as the current schedule, a decision is made as to whether the method 200 should be terminated or not, as shown by step 210. If the method 200 is terminated, then either the best schedule (the schedule with the best score) or the current schedule (which can, and frequently will, be the same as the best schedule) is chosen as the final schedule determined by the method 200. Generally, it is desirable to choose the best schedule as the final schedule. However, choosing the current schedule, even if the current schedule is not the best schedule, may be desirable in certain situations (e.g., to enable more frequent user intervention in a scheduling process that requires a large number of iterations to "solve") or for certain purposes (e.g., to debug operation of the scheduling system according to the invention).

If the method 200 is not terminated after rejection of a revised schedule, it is hoped that constraint violation repairs in the next iteration will repair the constraint violations in a different way so that a different revised schedule is obtained, having a different—and, it is hoped, better—score. This can occur because particular options for particular constraint violation repairs are chosen stochastically, enabling different repair options to be selected for each iteration. Further, even if the schedule is repaired in exactly the same way, the revised schedule may be selected in the later iteration because of the stochastic method for determining whether to retain a revised schedule having a worse score than the previous schedule.

If the method 200 is not terminated, then selected constraint violations of the current schedule are repaired (step 203) and a revised schedule is determined (step 204). As before, a score is calculated for the revised schedule (step 205) and a determination is made as to whether the score for the revised schedule is an improvement over the score for the current schedule (step 206). If so, the revised schedule is established as the current schedule (step 209); if not, the revised schedule may still be established as the current schedule (steps 207 and 209). This cycle of repairing the current schedule to obtain a revised schedule and scoring the revised schedule is continued until the method 200 is terminated at step 210.

Ideally, the method 200 does not terminate until the score of a revised schedule, when compared to the threshold score, indicates that the revised schedule either does not violate any constraints or only violates the constraints to an acceptable degree. However, it may occur that the method 200 does not produce an acceptable schedule (as measured by the threshold score) within an acceptable length of time because the nature of the scheduling problem has caused the method 200 to cycle indefinitely or to require a very long time to converge to a solution. Such situations can be avoided by establishing a limit either on the number of repair cycles or on the length of time for which the method 200 is allowed to operate.

The method 200 can be implemented, for example, on a computer. In one embodiment, the method 200 is implemented using the C++ programming language. However, the method 200 can be implemented using other programming languages or other techniques.

Figure 3A:
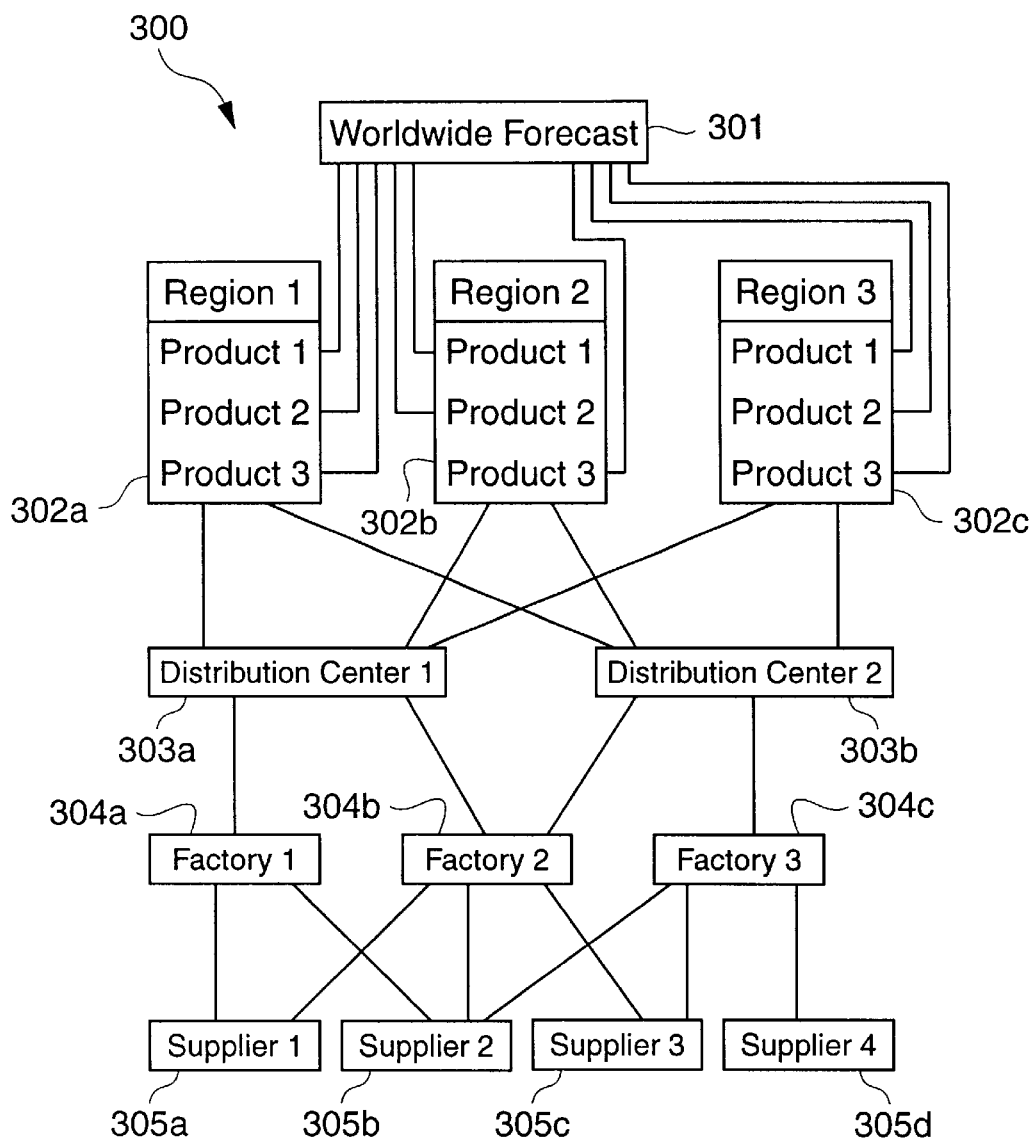
FIG. 3A is a schematic diagram illustrating a distribution system for which the system and method according to the invention can be used to provide a schedule.

FIG. 3A is a simplified schematic diagram illustrating a distribution system 300 for which the system and method according to the invention can be used to provide a schedule. This is an example of use of the system and method according to the invention for enterprise-wide exception management and master planning.

The system 300 includes, at the highest level, a worldwide forecast 301 that defines a quantity of a product to be produced. The worldwide forecast 301 is further subdivided into regional forecasts 302a, 302b and 302c, each regional forecast 302a, 302b or 302c being further subdivided into a forecast for each of Product 1, Product 2 and Product 3. Here, the regional forecasts 302a, 302b and 302c subdivide the worldwide forecast 301 along geographical lines; however, other bases for subdividing the worldwide forecast 301 can be used. Each of the distribution centers 303a and 303b supply products to meet the regional forecasts 302a, 302b and 302c. Each distribution center 303a or 303b can supply one or more of Product 1, Product 2 or Product 3 to meet each regional forecast 302a, 302b or 302c. The distribution centers 303a and 303b are, in turn, supplied by products produced by factories 304a, 304b and 304c. Factories 304a, 304b and 304c require supplies of raw materials or component parts that are supplied by suppliers 305a, 305b, 305c and 305d.

A planner can use the system 100 to schedule flows between each of the elements (as indicated by the lines between particular elements) of the system 300, using the method 200 (FIG. 2) implemented using the specific techniques described in more detail below. Scheduling activities for the system 300 illustrates another of the capabilities of the system and method according to the invention. Scheduling activities for the system 300 requires simultaneous consideration of both factory capacity constraints and equipment capacity constraints, i.e., consideration of constraints at different levels of detail. The factory capacity constraints come into play in scheduling the interrelationships between the large entities shown in FIG. 3A, e.g., distribution centers 303a and 303b, and factories 304a, 304b and 304c. The equipment capacity constraints come into play in scheduling activities within the large entities.

Figure 3B:
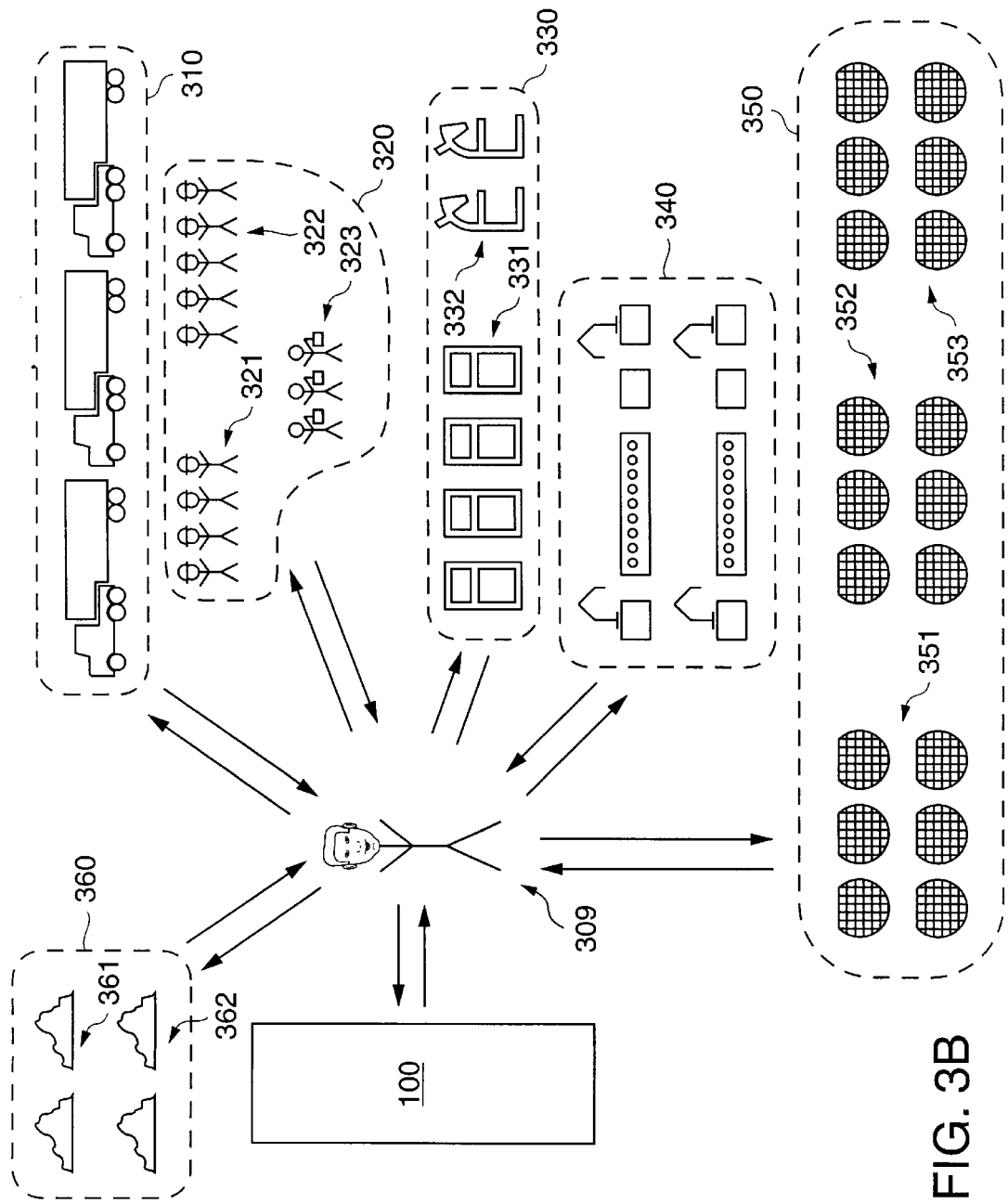
FIG. 3B is a simplified schematic diagram of a semiconductor processing operation for which the system and method according to the invention can be used to develop a schedule.

FIG. 3B is a simplified schematic diagram of a semiconductor processing operation for which the system and method according to the invention can be used to develop a schedule. This is an example of use of the system and method according to the invention in an application that is similar to factory exception management and master planning.

The processing operation includes various resource groups: delivery trucks 310, labor 320, equipment 330, assembly lines 340, semiconductor wafers 350 and raw materials 360. The system planner 309 uses the system 100 according to the invention to produce a schedule that interrelates the activities associated with each of the resource groups. Note that each of the resource groups can be further subdivided. For instance, labor 320 can include two groups of technicians 321 and 322, and a group of engineers 323. Equipment 330 can include a group of wafer processing machines 331 and a group of wafer analysis microscopes 332. Semiconductor wafers 350 can include three separate batches 351, 352 and 352 of wafers. Raw materials 360 can include silicon 361 and a metal 362 such as copper. These groups of resources will be discussed in more detail below insofar as they illustrate various aspects of the invention.

Though, above and below, explanation of the invention is frequently made with respect to scheduling manufacturing operations, the method and system according to the invention can be used to develop schedules for many other applications. For example, the invention can be used to schedule activities for various maintenance and repair operations such as maintenance and repair of aircraft for an airline. The system and method according to the invention would be used to schedule the activities of technicians and engineers, as well as the use of repair tools and replacement parts, among other things.

Figure 4A:
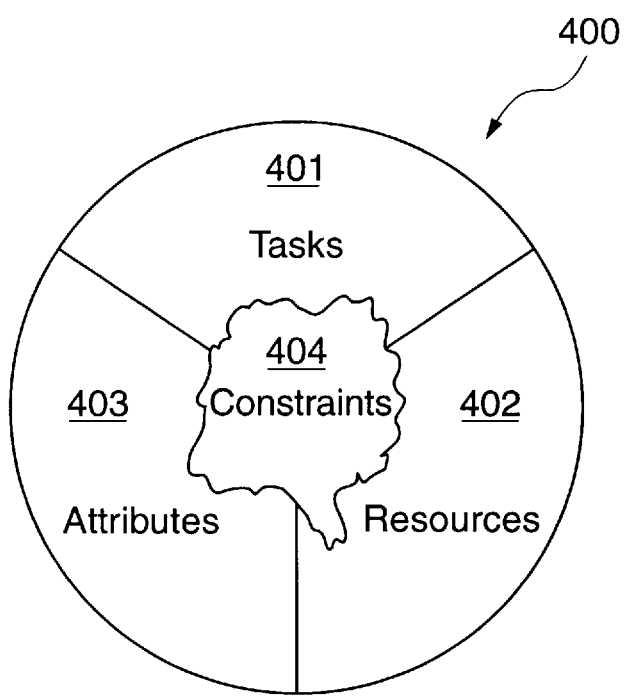
FIG. 4A is a schematic diagram illustrating a modeling structure that can be used with the system and method of FIGS. 1 and 2.

FIG. 4A is a schematic diagram illustrating a modeling structure 400 for use with a system, e.g., system 100, according to the invention. As noted above, "scheduling" is the process of assigning times and resources to the tasks of an operation. Information that models various tasks 401, resources 402 and attributes 403 associated with the operation to be scheduled is input into the system 100 (FIG. 1). Herein, "task" refers to any activity including, but not limited to, production, repair, shipping, maintenance, inspection, packaging, loading, picking, testing and chemical processing. "Tasks" also include, for example, work orders, build schedules, planned orders, purchase orders and sales orders. Also input into the system 100 is information that models the relationships between the tasks 401, resources 402 and attributes 403. The information modeling these relationships is expressed as a multiplicity of constraints 404. Herein, "constraints" are any conditions that impede the development of an acceptable schedule including, but not limited to, conditions, critics, requirements, limitations and exceptions. The constraints 404 can include, for example, temporal constraints, milestone constraints, resource constraints, state constraints and preemptive constraints, each of which are explained in more detail immediately below.

Temporal constraints order tasks with respect to each other. Specifically, temporal constraints establish a relationship between the start or finish time of one task and the start or finish time of another task. The temporal constraints used with the system and method according to the invention include finish-to-start, start-to-start, finish-to-finish, start-to-finish relationships between the times associated with two tasks. An example of a temporal constraint is end-time (Task1)≦start-time(Task2). Positive and negative delays can also be incorporated into these relationships. For example, one task could be constrained to start no later than two days before the end of a second task.

Milestone constraints relate tasks to fixed metric times. This prevents tasks from moving beyond or ahead of a certain date. An example of a milestone constraint is end-time(Task1)≦11/23/92 12:00:00.

Resource constraints are limitations on the use of resources to complete tasks. In the system and method according to the invention, resources can be either consumable (e.g., raw materials or component parts) or reusable (e.g., human labor or machines). Resources are modeled with "classes" and "pools." A class represents a type of resource consisting of a set of resource pools. An example of a class is Forklifts. A pool represents a particular collection of interchangeable resources within a class, the particular collection being differentiated from other resources within the class by a particular characteristic or characteristics. For example, within the class of Forklifts, there may be several pools of forklifts, each pool representing forklifts at a particular location. Each pool's maximum capacity designates the maximum amount of the resource that is initially available. The maximum capacity of a pool can vary over time. A resource history is maintained for each pool that tracks the availability of the pool over time.

Figure 4B:
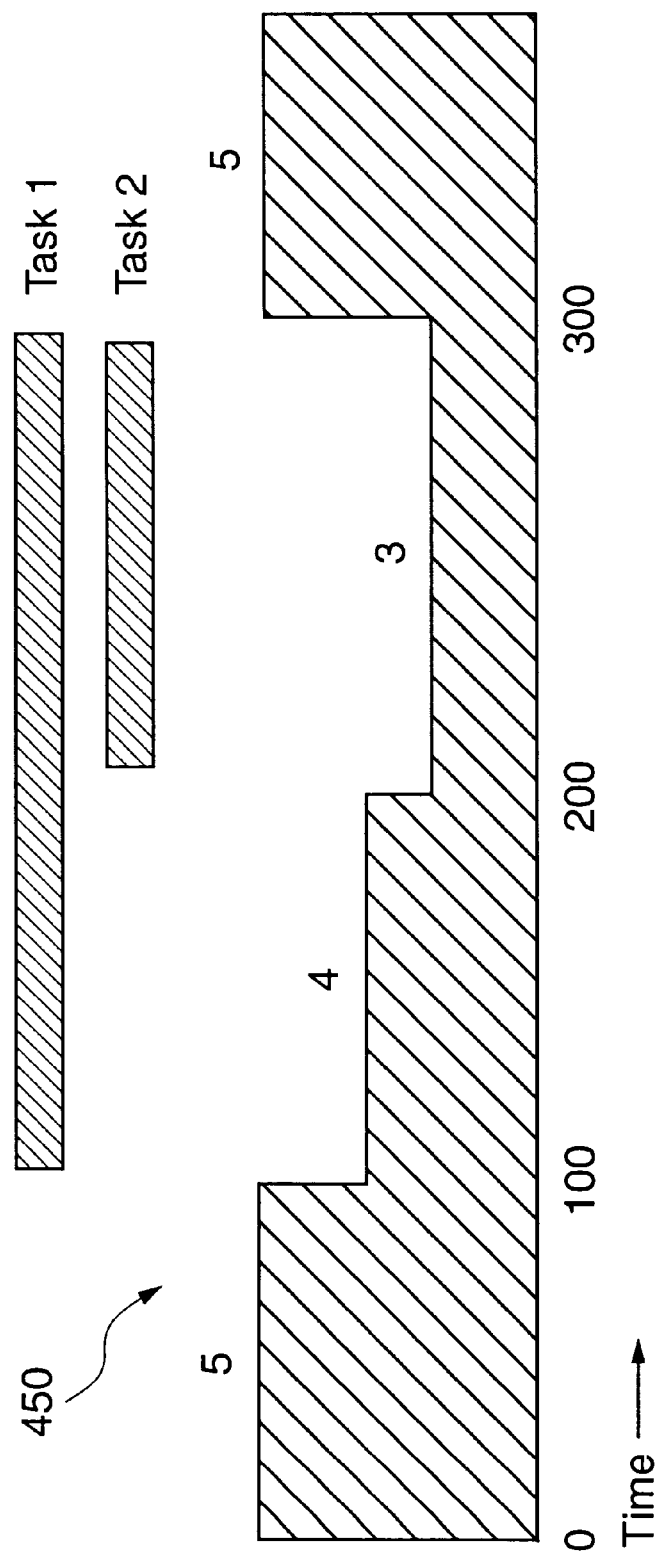
FIG. 4B is a schematic diagram illustrating maintenance of a resource history for a reusable resource pool.

FIG. 4B is a schematic diagram illustrating maintenance of a resource history 450 (shown as a histogram) for a reusable resource pool. At time 0, the quantity of the resource available in the resource pool is 5. As illustrated by the bar above the resource history 450, Task 1 begins at time 100 and requires 1 unit of the resource. Thus, the resource history 450 decrements 1 unit from the pool. The resource pool has 4 units available from time 100 to time 200. At time 200, Task 2 begins. Task 2 also requires 1 unit of the resource. Since Task 1 continues to take place, a total of 2 units are decremented from the resource pool. Consequently, the resource pool has only 3 units available from time 200 to time 300. At time 300, both Task 1 and Task 2 conclude, releasing the resources that were being used. As a result, the pool is incremented 2 units so that 5 units are again available in the resource pool.

In addition to classes and pools, there can be one or more intermediate sub-classes for further defining resources. For example, within the class of Forklifts, there may be several sub-classes, each sub-class representing a particular size of forklift. Generally, resources can be organized into groups according to a hierarchy, similar to that described above for forklifts, that has any number of levels.

Referring back to FIG. 3B, each of the resource groups —delivery trucks 310, labor 320, equipment 330, assembly lines 340, semiconductor wafers 350 and raw materials 360—are a resource class. Within the class of labor 320, technicians 321 and 322, collectively, represent a sub-class, as do engineers 323. The separate groups 321 and 322 of technicians represent pools. Similarly, in the class of equipment 330, wafer processing machines 331 and wafer analysis microscopes 332 are sub-classes. Within the class of semiconductor wafers 350, each of the batches 351, 352 and 353 are a pool of resources. Within the class of raw materials 360, silicon 361 and metal 362 are sub-classes of resources.

Each task has a set of resource requirements that designate the amount of resources required by the task. Each resource requirement consists of a type and quantity. The type defines the resource class that will satisfy the requirement. The quantity is the amount of the resource that will be decremented from the resource pool's availability. A resource requirement always extends from the start-time to the end-time of a task. An example of a resource requirement is Task1 requires 4 technicians from the start-time of Task1 to the end-time of Task1.

A resource constraint is automatically established for each resource requirement. The resource constraint states that the resource must not be over-allocated during the duration of the resource requirement, i.e., there must be an adequate amount of the resource in the resource pool to satisfy the resource requirement during its entire duration. Whether or not the resource constraint is satisfied is determined by comparing the resource requirement to the resource history for the pool. In practice, a multiplicity of tasks will establish resource requirements for a particular resource pool. As each task takes place, the available capacity of the resource pool is decremented by the amount of the resource used by the task. If the resource requirement of a task attempts to decrement the resource capacity below a pre-defined threshold level, a constraint violation occurs. The threshold level can be, for example, zero, or the threshold level can be a magnitude of resources established as a desired level of reserves (e.g., safety stock) for that resource.

State constraints are restrictions on attributes of a resource or other physical entity for a specified period of time. The attributes can be such things as the positions of switches or the configuration of mechanical parts such as a door. Each attribute can have several different values (or "states"), e.g., the door is open or closed. Tasks can have one or more "state effects" (i.e., cause a change in the state of an attribute) and/or be constrained by one or more "state requirements" (i.e., require a particular state during the task).

A state effect sets the state of an attribute during the interval of time specified by the state effect. The time interval can be open-ended, designating that the state will persist indefinitely, absent change by another task, after the task has begun. Or, the time interval can have a specified duration, such as the duration of the task that causes the state effect. For example, a task can have an effect that changes a switch from on to off. The state effect can specify that the switch remains off until the end of the task, or the state effect can specify that the switch remains off until some other task turns the switch back on.

A state requirement designates the state of an attribute that must exist during the task. A state constraint is automatically established for each state requirement. An example of a state requirement would be Task1 requires the value of POWER to be POWER-UP from the start-time of Task1 to the end-time of Task1.

An attribute history is maintained for each attribute analogous to the histories of resource pools. Attribute histories track the value of attributes over intervals of time. Along with recording the current value of the attribute, an attribute history maintains a record of the "changers" and "users" of an attribute during intervals of time. A changer of an attribute is a task having a state effect that changes the state of the attribute. A user of an attribute is a task that has a state requirement for the attribute.

To detect violation of state constraints, the value of an attribute at any particular time is determined from the "latest changer" of the attribute. The latest changer at a specific time is the changer that last affected the value of the attribute. The value of the attribute at the particular time is the state to which the latest-changer set the attribute. If any state requirements prescribe a different state, then a state constraint violation occurs.

A preemptive constraint is a limitation on the metric time during which a task can be performed. A preemptive constraint establishes a set of legal time periods during which the task can be performed. For example, a preemptive constraint may specify that no tasks are to be performed on a weekend day, or a preemptive constraint may specify that a task be performed during a particular work shift (e.g., 8:00 a.m to 4:00 p.m.) of a work day. If, for instance, a task has a duration of 16 hours, has a milestone constraint that specifies that the task begin on a Friday, and is subject to the above two preemptive constraints, then the task will begin at 8:00 a.m. on Friday and end at 4:00 p.m. on the following Monday.

A preemptive constraint can cause a task to be split into subtasks. (For instance, in the example above, the 16 hour task is split into two 8 hour subtasks.) Resource and state constraints can be enforced only during each individual subtask or during the entire time interval spanning from the beginning of the earliest subtask to the end of the latest subtask. In the former case, the constraints are ignored during the periods between the subtasks. However, in the latter case, the constraints are enforced during periods between subtasks. For example, a labor constraint typically would not be enforced during the periods between subtasks, since people are mobile and can easily move to another location for work on a task at that other location. On the other hand, an allocation of heavy machinery to a task may result in the constraint associated with that allocation being enforced during the periods between subtasks, since heavy machinery is difficult to relocate and would most practically have to remain at the site of the task, even though not in use, thereby precluding the use of the heavy machinery for tasks at other sites.

Associated with each constraint is a penalty and a weight. The penalty is a function that indicates the degree to which the constraint is violated. In one embodiment, the penalty is expressed as a non-negative number, penalties of larger magnitude indicating a greater degree of constraint violation. In another embodiment, the penalty is expressed as a number between 0 and 1 inclusive.

For example, the penalty associated with a milestone constraint may increase linearly with the length of time by which the milestone constraint is violated. The penalty associated with a constraint can also be constant regardless of the degree of violation of the constraint. In one embodiment, violations of all constraints are assigned a penalty of 1, regardless of the degree of violation. In another embodiment, violations of all constraints except milestone constraints are assigned a penalty of 1, regardless of the degree of violation, and violations of milestone constraints are assigned a penalty between zero and 1 that is proportional to the length of time by which the milestone constraint is violated.

The weight is a characteristic of each constraint that indicates the importance associated with violation of that constraint. In one embodiment, the weight is expressed as a non-negative number, weights of larger magnitude indicating constraints of greater importance. In another embodiment, the weight is expressed as a number between 0 and 1 inclusive.

For example, meeting a due date for production of a particular finished good may be twice as important as eliminating overtime work on weekends, in which case the magnitude of the weight of the due date constraint would be twice that of the overtime constraint.

As explained above, the method 200 (FIG. 2) begins with a complete schedule of unacceptable quality (step 201) and iteratively modifies the schedule until a schedule of acceptable quality is produced (steps 202 through 210). In the method 200, the quality of a schedule is measured by its score (steps 202 and 205). In one embodiment, the score, given by equation (1) below, is the weighted sum of the penalties associated with particular constraint violations divided by the sum of the weights for all constraints.

$$Score = \frac{\sum_{ci}(Penalty_{ci} * Weight_{ci})}{\sum_{ci} Weight_{ci})} \quad (1)$$

As discussed above, the method according to the invention can, and typically will, result in the addition of tasks to successively determined revised schedules. For this reason, it is necessary that the score be determined by dividing by the sum of the weights of all constraints; if this was not done, and the score was merely the weighted sum of the constraint violation penalties, the method would frequently never converge to an acceptable solution, since the addition of new tasks to the schedule would typically cause the weighted sum of the penalties to increase, despite the fact that a lower percentage of constraints were being violated, thereby resulting in the constant rejection of revised schedules.

Figure 5:
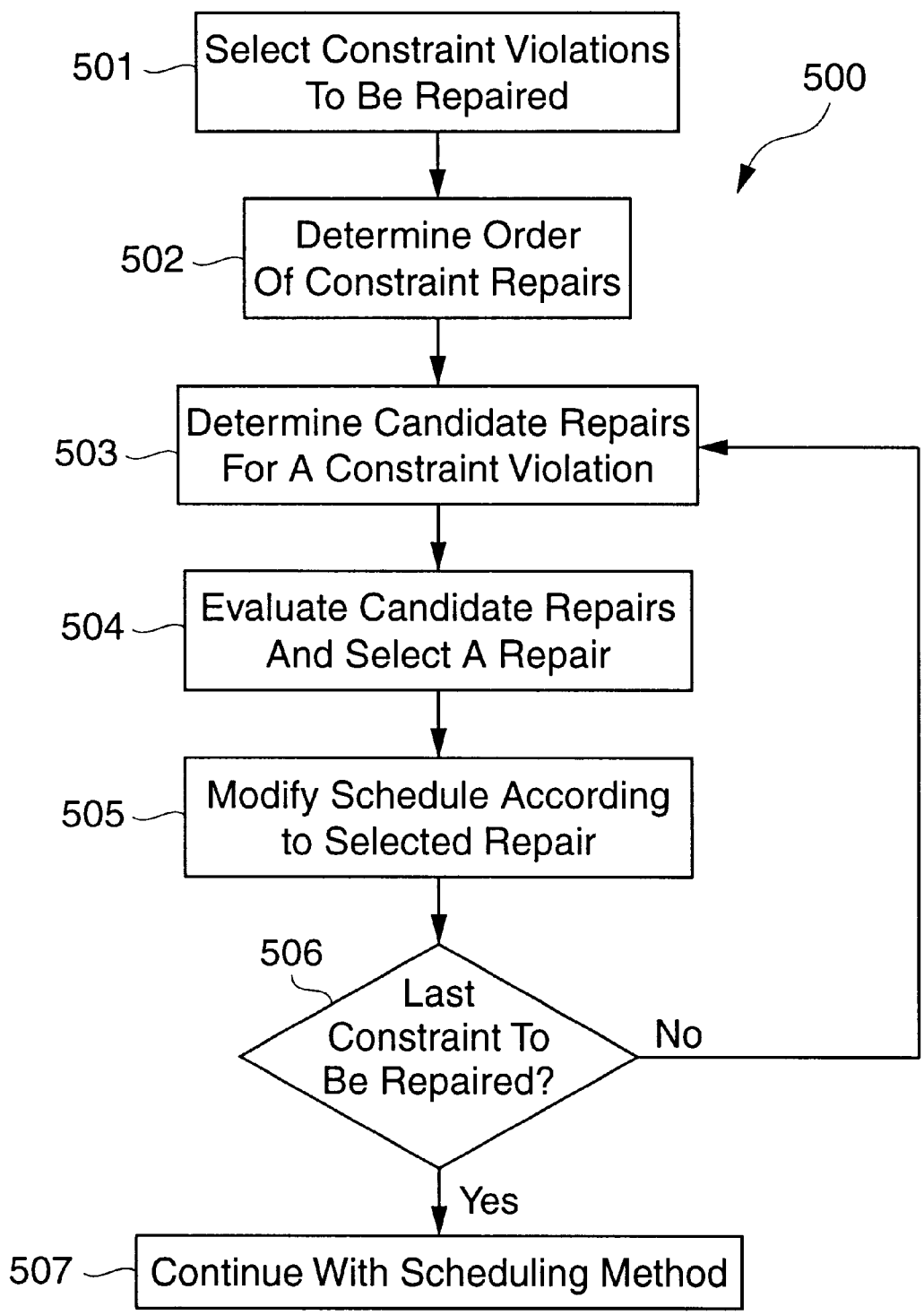
FIG. 5 is a flow chart illustrating a method according to one embodiment of the invention for repairing constraint violations.

Constraint violations are, in the particular embodiment described above, identified as constraints having non-zero penalties. A schedule is revised by repairing constraint violations (step 203 of method 200). FIG. 5 is a flow chart illustrating a method 500, according to one embodiment of the invention, for repairing constraint violations.

It is not necessary to repair each constraint violation, though this can be done. Typically, since the number of constraints (and, therefore, usually the number of constraint violations) for the activity being scheduled is large, it is desirable to select only a subset of the constraint violations for repair during each schedule revision iteration; this is shown by step 501 in the method 500. Selection of only a subset of all constraint violations for repair decreases the time spent on any given scheduling iteration, minimizes the possibility of large perturbations in the schedule that can degrade the dynamic performance of the scheduling method, and minimizes the possibility that different constraint repairs will introduce conflicting schedule changes. On the other hand, as the number of constraints selected for repair during each iteration is decreased, the number of iterations required to achieve a schedule of a particular quality is increased. Since a number of computations occur during each iteration in addition to schedule repair, the increasing number of iterations can become computationally prohibitive. In particular, calculation of a score for the schedule determined during each iteration is computationally expensive. Thus, the number of constraint repairs performed during each iteration is chosen as a tradeoff among all of the factors discussed above.

The subset of constraint violations to be repaired can be selected in one of a number of ways. For example, a predetermined number of constraint violations may be picked randomly for repair. The constraint violations can also be ordered in some fashion and the first constraint violations up to a predetermined number selected for repair. Or, constraint violations can be selected according to one or more heuristics. For example, only constraint violations that occur within a specified time interval may be selected, e.g., within one week from the current time. Perhaps only constraints of a certain type are selected, e.g., all resource constraints or particular resource constraints. Or, constraints associated with certain troublesome resources might be selected, e.g., resources that are chronically over-allocated. In this latter example, the troublesome resources could be identified manually by the user, or automatically by the system using "knowledge" gained from previous scheduling activity by the system. The strategies used in selecting constraints for repair can, and typically will, vary for different applications for which the system and method according to the invention are used. Additionally, the technique used to select the subset of constraint violations for repair can be different for each iteration of the scheduling method.

Apart from selecting only a subset of constraint violations for repair, the constraint violations can be repaired in a desired order. This is shown as step 502 in method 500; however, this step is optional and need not necessarily be part of method 500. Ordering of constraint repairs may be particularly important since, as noted above, when constraint repairs produce conflicting schedule changes, the repair that occurs last in time supersedes any other conflicting repairs. The order of constraint repairs can be determined according to any desired criterion or criteria. For instance, constraint violations occurring nearest in time to the present can be repaired first. Alternatively, such constraints could be repaired last. There are many possibilities.

After particular constraint violations are selected for repair, each constraint violation is repaired using a repair method that is particularly associated with that constraint. Each repair method is constructed so that the repair method seeks only to lower the penalty associated with the constraint being repaired. While such local repairs do occasionally produce globally undesirable effects in a revised schedule, even if the revised schedule is retained for further modification the undesirable effects are usually improved or eliminated after several iterations. Typically, each repair method includes several options for repairing the constraint; examples of these options, and procedures for selecting one of the options, are discussed below for particular types of constraints. Generally, the repair method seeks to avoid repairs that result in drastic changes to the schedule, since such drastic changes may perturb the schedule excessively.

Repairing a constraint violation typically involves moving to different times one or more tasks that cause the constraint violation. The exact locations to which the tasks are moved are determined stochastically. When rescheduling a task causes other temporal constraints to be violated, other tasks are moved until the temporal constraints are satisfied. If there is no way to re-establish temporal consistency, the original rescheduling move is rejected, the constraint remains violated, and the constraint violation is resolved in some other manner during a future iteration (i.e., by moving the task or tasks to different locations—different because of the stochastic nature of the location selection process—during the future iteration). Thus, temporal consistency is accomplished by recursively enforcing temporal constraints until there are no outstanding temporal constraint violations, thereby preserving temporal constraints through all constraint violation repairs. Stated another way, none of the temporal constraints will ever require repair. However, soft temporal constraints, as explained in more detail below, can be violated and subsequently repaired.

As described above, a preemptive constraint is a limitation on the metric time during which a task can be performed, resulting in the establishment of a set of legal time periods during which the task can be performed. Violation of a preemptive constraint (i.e., scheduling of a task during a non-legal work period) is resolved in a manner similar to that used to resolve temporal constraints. The portion of the task causing the violation (i.e., the part of the task scheduled during the non-legal work period) is rescheduled to the next available legal work period, either forward or backward in the schedule, according to pre-determined criteria. If this task rescheduling causes other temporal constraints to be violated, the other tasks involved in the new violation are moved until the temporal constraints are satisfied. If there is no way to re-establish temporal consistency, the original rescheduling move is rejected, the constraint remains violated, and the constraint violation is resolved in some other manner during a future iteration.

As described above, a milestone constraint relates a task to a fixed metric time. A milestone constraint is repaired by moving the task to a time that is nearer to the milestone constraint. The exact location to which the task is moved is chosen stochastically. As with temporal and preemptive constraints, if this task rescheduling causes other temporal constraint violations, the other tasks involved in the new violation are moved until the temporal constraints are satisfied. If there is no way to re-establish temporal consistency, the original rescheduling move is rejected, the milestone constraint remains violated, and the constraint violation is resolved in some other manner during a future iteration.

The method according to the invention can employ different techniques to guide the selection of constraint repairs. One technique is heuristic repair; this technique is shown as part of the method 500. After violated constraints have been selected for repair (and ordered, if desired), for each constraint, a small subset (candidate repairs) of all possible schedule modifications that can effect repair of the constraint is chosen, as shown by step 503. Generally, the candidate repairs vary according to the type of constraint violated, e.g., reusable resource constraint, consumable resource constraint, state constraint, preemptive constraint. The candidate repairs are chosen according to criteria devised to select modifications that have the best chance of repairing the violated constraint without unnecessarily perturbing the schedule (and thus causing more violations). Once all candidate repairs have been identified, each one is scored according to certain heuristics, and a selection is made based upon those scores, as shown by step 504. The candidate modifications and the heuristics used to score candidate modifications both vary with the type of constraint violation being repaired.

The system and method according to the invention enable repair of both consumable and reusable resource constraints. According to one embodiment of the invention, for each reusable resource constraint violation (i.e., over-allocation of a reusable resource at a particular time), the method first attempts to substitute a different resource of the same class. If this is unsuccessful, then each task that causes the over-allocation of the resource is considered for a possible move to another time, either the next earlier or the next later time where the resource is "available." For this purpose, "available" is defined as a specified percentage of the amount of the over-allocation. (Of course, the specified percentage can be 100%.) Thus, in this embodiment, for a reusable resource constraint violation which cannot be repaired by substitution of a different resource of the same class, the candidate repairs (step 503 of method 500) are the collection of two possible moves for each task that over-allocates the resource. The candidate repairs are evaluated (step 504 of method 500) based upon a score determined according to the following considerations:

1. Fitness: Move the task whose resource requirement most closely matches the amount of over-allocation. A task using a significantly smaller amount is not likely to have a large enough impact on the current violation being repaired. A task using a far greater amount is more likely to be in violation wherever it is moved. A relatively higher score is assigned to a task whose resource requirement more closely matches the amount of over-allocation.

2. Temporal Dependents: Move the task with the fewest number of temporal dependents. Moving a task with many dependents is likely to cause temporal constraint violations and result in many tasks being moved. A relatively higher score is assigned to task moves whose number of temporal dependents is lower.

3. Distance of Move: Move the task that does not need to be shifted significantly from its current time. A task that is moved a greater distance is more likely to cause other tasks to move as well, increasing perturbation and potentially causing more constraint violations. A relatively higher score is assigned to task moves of shorter distance in time.

Each candidate move (two for each task, one earlier and one later) is scored using a linear combination of the Fitness, Temporal Dependents, and Distance to Move heuristic values. Each score is then used to establish a probability that the particular candidate move will be selected, the magnitude of the probability varying directly with the relative magnitude of the score for the candidate move. One of the candidate task moves is then selected at random with the possibility of a particular move being selected governed by the corresponding probability.

The system and method according to the invention also enable repair of consumable resource constraints. This has not previously been possible in systems that use iterative repair for scheduling. Unlike repairs to reusable resource constraint violations, repairs to consumable resource constraint violations cannot always be achieved by moving one or more tasks. In some cases, a new task or tasks must be added to the schedule to produce more of the consumable resource. According to one embodiment of the invention, to repair a consumable resource constraint violation the method according to the invention selects (step 503 of the method 500) one of the following repairs:

1. Move a task ("supplier") that supplies the consumable resource to a time in the schedule that is before or at the start-time of the task ("consumer") that consumes the consumable resource causing the constraint violation. The supplier can either be a scheduled procurement of the consumable resource or scheduled production of the consumable resource.
2. Move the task that consumes the consumable resource causing the constraint violation to a time that is earlier or later, where there is enough of the consumable resource to meet at least a specified percentage of the task requirement. If the task is moved earlier, this will, of course, cause other consumable resource violations that must be resolved in future iterations.
3. Explode a routing option (i.e., a set of tasks that supply the consumable resource) that culminates in the supply of the consumable resource at the start-time of the task that causes the consumable resource constraint violation. Prefer routing options in order of increasing cost, i.e., if possible select the least expensive routing option.

Preferably, one of the first two options is chosen, the choice being made stochastically according to predetermined percentages associated with each option. In one embodiment, 50% of the time a supplier is moved to an earlier time and 50% of the time the consumer is moved to a later time.

If neither of the first two options can be implemented (i.e., there is insufficient inventory available at any other time on the schedule), then a routing option is exploded (i.e., tasks are added to the schedule, the culmination of which is the supply of the consumable resource). Generally, the least expensive routing option that can supply the consumable resource is chosen. If repeated use of the least expensive routing option causes other resource constraint violations (consumable or reusable), then, in future iterations, other constraint repairs may repair those violations or substitute the second least expensive routing option for one or more instances of the least expensive routing option. It should also be noted that, in some cases, more than one instance of the routing option must be added to the schedule to repair the consumable resource constraint. In some cases, at the option of the user, the explosion of a routing option is precluded and only task moves are allowed.

The repair of consumable resource constraints can be readily understood by discussion of this repair in the manufacturing context. For example, finished goods are a consumable resource. According to one embodiment of the invention, when a finished goods constraint violation occurs, some percentage of the time (e.g., 50%) a supplier (order or production) is moved earlier in the schedule and some percentage of the time (e.g. 50%) the consumer is moved later in the schedule. According to a specific embodiment of the invention, movement of a supplier to an earlier time is accomplished by moving the next supplier occurring after the start-time of the consumer to the start-time of the consumer. According to another specific embodiment of the invention, movement of the consumer to a later time is accomplished by moving the consumer to the nearest subsequent time at which an adequate supply of the consumable good is provided.

If neither of these repairs can be performed, then the least expensive routing option is instantiated onto the schedule. (As above, at the option of the user, the explosion of routing options can be precluded and only task moves allowed.) The routing options can be, for example, a production flow through a factory or a procurement such as a purchase from a vendor. Generally, a routing option is a series of tasks, the routing option being modeled to include: i) temporal constraints, ii) bill of materials entries, iii) bill of resources entries, iv) bill of labor entries, and v) a cost. The cost is used to evaluate which routing option is the least expensive. The temporal constraints are the same as the temporal constraints previously discussed. The bill of materials entries include information as is common in MRP methods, and the bill of labor and bill of resources entries include information that is analogous to a bill of materials entry. For example, each of the bill of materials entries may include a part or material number, a quantity, a step number to indicate at what point the material is needed in the routing option, and an effectivity date which can be used to specify the period of time until which, or after which, the particular part or material is to be used. The temporal constraints, bill of material entries, bill of resource entries and bill of labor entries are used to define the series of tasks to be added to the schedule to accomplish the routing option.

Another example of repair of a consumable resource constraint in the manufacturing context is the replenishment of a raw material shortage. In one embodiment of the invention, the repair method first tries to move a previously planned order of the raw material to a time before the consumer that gave rise to the constraint violation. If that doesn't work, then the consumer that uses the raw material can be moved to a later time in the schedule after additional supplies of the raw material are provided. If neither of the first two options can be implemented (i.e., there are insufficient raw materials available at any other time on the schedule), then a routing option is exploded (i.e., tasks are added to the schedule to supply the raw material). The routing option can be chosen, for instance based on cost, lead time and vendor. Again, tasks are added to the schedule by the routing option in order to replenish the consumable resource and repair the constraint violation.

Unlike repairs to reusable resource constraint violations, and like repairs to consumable resource constraint violations, a repair to a state constraint violation cannot always be achieved by moving one or more tasks. A particular task ("violated task") causes each state constraint violation. To repair a state constraint violation, rather than reassigning the violated task to a time when the attribute value is set to the proper value, a new task ("achiever") that achieves the required attribute value can be added to the schedule. According to one embodiment, to repair a violated state constraint, the method according to the invention selects (step 503 of the method 500) one of the following repairs:

1. Insert an achiever that sets the needed attribute value from the start-time to the end-time of the violated task. Addition of an achiever will be prevented if it produces other state constraint violations in the schedule.
2. Move the violated task forward to a time where the required attribute value exists.
3. Move the violated task backward to a time where the required attribute value exists.

4. Move the violated task forward to a time where the attribute value can be changed without causing additional state constraint violations. Then insert an achiever to change the attribute value for at least the duration of the violated task.
5. Move the violated task backward to a time where the attribute value can be changed without causing additional state constraint violations. Then insert an achiever to change the attribute value for at least the duration of the violated task.

The possible repairs are evaluated as follows (step 504 of the method 500). The first repair method above is always considered before the other four repair methods. If the first repair method can be implemented (i.e., it does not produce other state constraint violations in the schedule), the other repair methods are ignored. This approach prevents unnecessary task rescheduling, i.e., it minimizes the perturbation of the schedule.

If the first repair method can not be implemented, then one of the other four repair methods is selected. To choose between the repair methods, each repair method is given a score based on the distance that the task must be moved, as a result of implementation of the particular repair method, to fix the state constraint violation, and whether any temporal dependents (i.e., tasks related to the violated task by a temporal constraint) would have to be moved as well. The system selects one of the repair methods stochastically based upon the relative values of the scores for each method. Repair methods with a higher score are more likely to be chosen.

Many other types of constraints can be used with a system and method according to the invention in addition to, or in lieu of, those described above. Description of additional examples of such constraints is given immediately below. It is to be understood that the constraints described above and those described below do not represent an exhaustive list of the types of constraints that can be used with a system or method according to the invention, but rather are merely illustrative of such constraints.

One example of an additional type of constraint that can be used with a system or method according to the invention is a "setup optimization constraint." The setup optimization constraint attempts to control the number of changes in state of a particular apparatus, system or process, the assumption being that such changes are generally undesirable because of the costs associated with making the change. In the manufacturing context, this type of constraint can be associated with, for example, the number of times that the configuration of a machine or an assembly line is switched from one configuration to a different configuration. Such configuration switches may be necessary, for example, to enable the machine or assembly line to produce or operate on different components.

In one embodiment of the invention, a changeover cost is defined as a function of an initial configuration, a configuration after change to a new configuration, and the type of resource (apparatus, system, process) that is being changed in configuration. In this embodiment, the penalty associated with a setup optimization constraint is proportional to the sum of the actual changeover costs divided by the sum of the worst possible changeover costs, where each of the worst possible changeover costs are calculated based on the assumption that the most costly possible configuration change occurs each time a configuration change is made. In this embodiment, the repair method for repairing violations of a setup optimization constraint is chosen from the option of swapping the ordering of two tasks in a manner that reduces the actual changeover cost, or swapping a resource assignment for a particular task so that the actual changeover cost is reduced.

In another embodiment of the invention, the penalty associated with a setup optimiztion constraint is proportional to the number of times that the apparatus, system or process is changed from one configuration to another. In this embodiment, the repair method moves a task or tasks that cause the configuration changes to other (either earlier or later) times.

Another example of an additional type of constraint that can be used with a system or method according to the invention is a "labor cost constraint." The labor cost constraint attempts to control various aspects of labor costs in order to minimize the overall cost of labor. For example, one labor cost constraint could seek to minimize the amount of overtime worked, e.g., weekend work ("overtime" constraint). Another labor cost constraint could seek to fully use each allocated shift of labor ("shift usage" constraint) For example, if workers are assigned in 8 hour blocks, the constraint may seek to order tasks so that each worker is fully employed during the entire 8 hour shift. In one embodiment of the invention, the penalty associated with the labor cost constraint is proportional to the "unnecessary" cost of labor. In a particular embodiment, the penalty is expressed as the actual labor cost divided by the minimum necessary labor cost. For the overtime constraint, for example, the unnecessary cost of labor is the wages that must be paid, in addition to the base wage, as a result of overtime work. For the shift usage constraint, for example, the unnecessary cost of labor is the cost of the unused portion of each worker shift. In one embodiment, the repair method for repairing violations of the labor cost constraint moves a task or tasks to minimize the unnecessary cost of labor, e.g., minimize overtime or fully use each worker shift.

Yet another example of an additional type of constraint that can be used with a system or method according to the invention is an "excess consumable resource constraint." The excess consumable resource constraint attempts to minimize at any given time the amount of a consumable resource that is carried, but unallocated to a specific future use, and attempts to minimize the length of time that a consumable resource is carried before it is used. The assumption here is, of course, that carrying a large unallocated amount of a consumable resource is undesirable because of the costs that are associated with the production, storing and tracking of the consumable resource. In the manufacturing context, this type of constraint can be used, for example, to minimize the inventory of a raw material or finished good. In one embodiment of the invention, the penalty associated with this constraint is calculated as the "dollar-days" of excess consumable resource carrying. The "dollar-days" are proportional to the cost (i.e., the cost to produce or procure the consumable resource, as well as the cost to store the consumable resource) of each unit of the consumable resource, the unallocated amount of the consumable resource, and the duration of time that the unallocated amount of the consumable resource is carried. In this embodiment, the repair method for repairing violations of the excess consumable resource constraint is chosen from the following options: i) moving a producer of the consumable resource to a later time, ii) moving a consumer of the consumable resource to an earlier time, or iii) lowering or eliminating production of the consumable resource at one or more times (e.g., removing from the schedule one or more instantiations of a routing option that produce the consumable resource). It can be seen that this embodiment of the consumable resource constraint is similar (though opposite) to the consumable resource constraint discussed above.

Still another example of an additional type of constraint that can be used with a system or method according to the invention is a "soft temporal constraint." The soft temporal constraint is the same as a regular temporal constraint, but the necessity for satisfaction of the constraint is relaxed from the absolute requirement associated with regular temporal constraints. For example, in the manufacturing context, it may be preferable, but not necessary, to assemble a product so that one component is assembled before another. Like regular temporal constraints, soft temporal constraints are repaired by moving tasks to satisfy the constraint. The "softness" of the constraint can be signified by assigning a weight having a relatively small magnitude.

Another example of an additional type of constraint that can be used with a system or method according to the invention is a "on-time delivery constraint." The on-time delivery constraint attempts to minimize the number of times that a delivery is made past a due date. In the manufacturing context, this type of constraint can be used, for example, to minimize the number of times that a finished good is delivered late to a customer. In one embodiment of the invention, the penalty associated with this constraint is proportional to the number of late deliveries divided by the total number of deliveries. In this embodiment, the repair method for repairing violations of the on-time delivery constraint is to move a delivery earlier. If this movement causes other constraint violations, these violations can be fixed in future iterations.

Another example of an additional type of constraint that can be used with a system or method according to the invention is a "perturbation constraint." The perturbation constraint tends to minimize the number of schedule changes, relative to the size of the schedule, made to the original schedule. In one embodiment of the invention, the penalty associated with this constraint is proportional to the total number of tasks moved up to the current time divided by the total number of tasks in the schedule at the current time. In this embodiment, there is no repair method associated with the perturbation constraint; rather, the constraint causes schedules with fewer schedule changes to be preferred by making the score for schedules with many changes relatively worse than that for schedules with few changes.

Still another example of an additional type of constraint that can be used with a system or method according to the invention is a "consumable resource balancing constraint." The consumable resource balancing constraint attempts to maintain the level of consumable resources stored at each storage location within a pre-determined threshold range. In the manufacturing context, this type of constraint can be used, for example, to control inventory levels at various warehouses. In one embodiment of the invention, the penalty associated with this constraint is proportional to the total storage locations that are storing inventory at a level outside of the threshold range divided by the total number of storage locations. In this embodiment, the repair method for repairing violations of the consumable resource balancing constraint is chosen from the following options: i) add one or more tasks to the schedule that transfer inventory from an overstocked storage location to an understocked storage location, ii) supply more of the consumable resource to an understocked storage location, either by moving one or more tasks that supply the consumable resource to an earlier time, moving one or more tasks that consume the consumable resource to a later time, or exploding a routing option that supplies the consumable resource, or iii) reduce the amount of the consumable resource at an overstocked storage location, either by moving one or more tasks that supply the consumable resource to a later time, moving one or more tasks that consume the consumable resource to an earlier time, or unscheduling tasks that supply the consumable resource.

Yet another example of an additional type of constraint that can be used with a system or method according to the invention is an "equipment utilization constraint." The equipment utilization constraint attempts to maximize the usage of equipment. This type of constraint can be used to, for example, attempt to schedule particular equipment for round-the-clock usage, or to schedule equipment that moves between various locations so that the amount of equipment "down-time" is minimized. In one embodiment of the invention, the penalty associated with this constraint is proportional to the amount of time that the equipment is used divided by the total amount of time that the equipment is available. In this embodiment, the repair method for repairing violations of the equipment utilization constraint is to add tasks to the schedule that utilize the equipment during time periods when the equipment is not in use, e.g., add more production tasks to the schedule that more fully use production equipment.

Another example of an additional type of constraint that can be used with a system or method according to the invention is a "delivery cost constraint." The delivery cost constraint attempts to minimize the cost of delivering resources or goods to or from the operation that is being scheduled. For instance, in the manufacturing context, this type of constraint can be used, for example, to minimize the shipping costs associated with obtaining a particular raw material. In one embodiment of the invention, the penalty associated with this constraint is proportional to the total cost of all deliveries of a particular resource or good divided by the highest possible cost of making those deliveries. The highest possible cost is calculated as the cost resulting from using the highest cost delivery option for all of the deliveries. In this embodiment, the repair method for repairing violations of the delivery cost constraint is to substitute a first set of tasks for a second set of tasks, where the first set of tasks have a lower associated delivery cost than the second set of tasks.

As described above, the system and method according to the invention determine a schedule for a complex activity (or "scheduling problem") which is described (or "modeled") by, among other things, a multiplicity of constraints. In practice, an activity frequently changes in nature, necessitating that the set of constraints describing the activity be changed to reflect the changes in the nature of the activity. The system and method according to the invention can easily accommodate such changes. Constraints can be modified by simply changing the penalty function, the weight and/or the repair method associated with the constraint. Likewise, constraints can be added to the system by defining a corresponding penalty function, weight and repair method. Finally, constraints can be easily deleted by simply deleting the corresponding penalty function, weight and repair method.

"Time fences" are used to restrict the set of possible repairs. No task is allowed to be added outside (before or after) the time fence and no task is allowed to be moved outside the time fence. For example, if a new planned order for materials is added to the schedule where the start of the planned order, i.e., the order date, is before an early time fence, then the order would be impossible.

More generally, all constraints can be classified along a continuum of "soft" to "hard" constraints. Soft constraints are constraints that are preferably not violated, but can be violated without introducing physically impossible situations into the schedule. The softest constraints are constraints for which a violation generates the least problem or concern regarding the violation. Violation of a soft constraint may simply result in a task being more costly than desired. Optimization constraints are an example of soft constraints. Another example is the "soft temporal constraint" discussed above. At the other end of the continuum, the hardest constraints are those constraints for which a violation represents a physically impossible situation, e.g., violation of a time fence. Hard constraints can be modeled by, for example, freezing a certain task on the schedule. Additionally, the hardness or softness of a constraint can be modeled by associating a relatively large weight with a hard constraint and a relatively small weight with a soft constraint.

Once the repair for a constraint violation is chosen (step 504 in FIG. 5), the selected repair is then used to modify the schedule, as shown by step 505. As shown by step 506, after the constraint violation is repaired, a determination is made as to whether there is another constraint violation to be repaired. If there is, then the candidate repairs for the next constraint violation are determined (step 503) If there are no more constraint violations to be repaired, then, as shown by step 507, the remainder of the scheduling method continues.

Another technique that can be used with the invention for guiding the selection of constraint repairs is lookahead repair. In lookahead repair, a task that causes a constraint violation is identified, all possible moves for the task are considered, and the move that minimizes the number of remaining constraint violations is chosen.

Lookahead repair can be combined with heuristic repair. For example, a system according to the invention could accomplish "tough" repairs using lookahead repair and "easy" repairs using heuristic repair. Further, the system could incorporate some heuristics to decide which repair technique, heuristic or lookahead, to use for a particular type of repair, deciding on the repair technique to use for repair of each constraint during the scheduling process.

The selection of an efficient repair method depends at least in part on two characteristics of the particular scheduling problem: problem size and constraint "tightness." Heuristic evaluation (a less informed technique) works better on larger or loosely constrained scheduling problems. Lookahead techniques are more effective on smaller or highly constrained scheduling problems. It is possible to combine these two approaches. In particular, it may be desirable to use heuristic repair during the early stages of a method according to the invention when the number of constraint violations to be repaired is large, and use lookahead repair during the latter stages of the method when there are only a final few "tough" violations to be resolved.

At the end of each iteration, after the schedule is revised according to the individual constraint violation repairs, the score of the revised schedule is determined. As described above with respect to FIG. 2, in some cases, even if the score of the revised schedule is not improved as compared to the score of the previous schedule, the revised schedule is selected for further modification to avoid becoming stuck at a local minimum.

Figure 6:
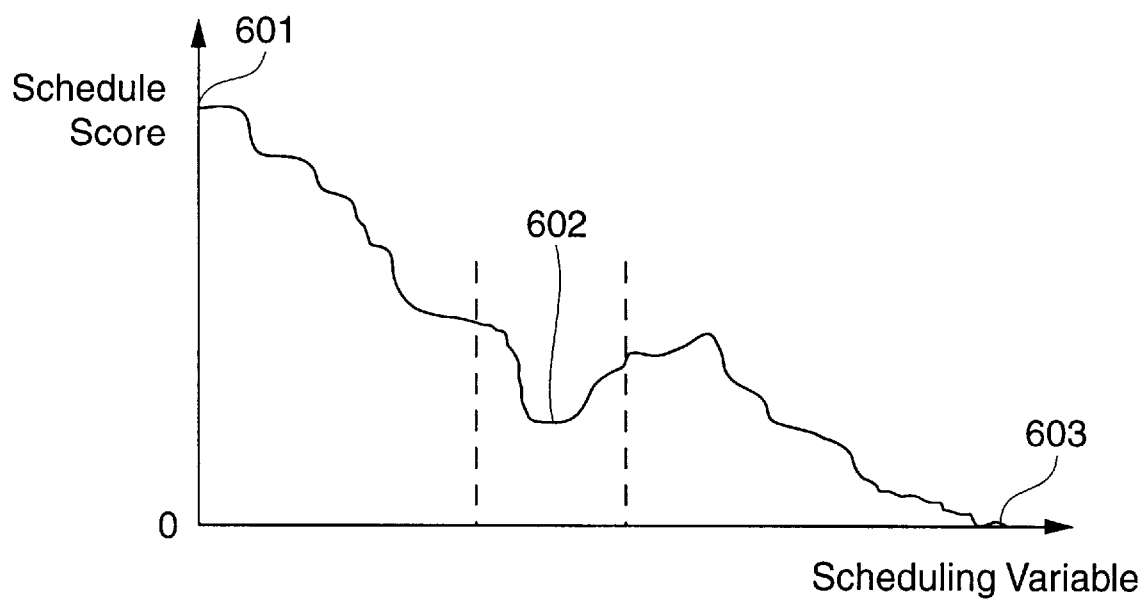
FIG. 6 is a graph of schedule score as a function of a single scheduling variable, illustrating the problem associated with a local minimum.

FIG. 6 is a graph of schedule score as a function of a single scheduling variable, illustrating the problem associated with a local minimum. (Though, obviously, a typical scheduling problem is a function of many more variables, FIG. 6 most clearly illustrates the problem.) Initially, as shown by point 601, the scheduling variable has a value such that the score of the schedule is much greater than zero. (It is assumed that higher scores represent schedules having worse scores and that a perfect schedule has a score of zero.) It is the goal of a scheduling method according to the invention to gradually change the value of the scheduling variable until the scheduling variable has a value such that the schedule score is zero, as shown by point 603. Since a method according to the invention always accepts a revised schedule having a better (lower) score, the value of the scheduling variable gradually moves from point 601 toward point 603. However, after the schedule at point 602 is reached, any newly determined schedule corresponding to a value of the scheduling variable within the range in which the revised value of the scheduling variable is likely to fall (as shown by the dashed lines in FIG. 6), has a worse (higher) score than the schedule at point 602. Thus, if a method according to the invention never accepted a revised schedule having a worse (higher) score than the current schedule, it might not be possible to escape a local minimum (point 602) as illustrated in FIG. 6, so that the method would not be able to determine the optimum solution represented by point 603. Since, in practice, local minima frequently occur in scheduling problems, such a characteristic would be an extremely undesirable limitation of a method according to the invention. Thus, in certain situations, a method according to the invention accepts revised schedules having a worse score than the current schedule.

In one embodiment of the invention, a stochastic technique is used to occasionally select a schedule with a worse score than the previously determined schedule. In one particular embodiment, for example, an escape function is defined, $$\text{Escape}(S_1, S_2, T) = e^{-|Cost(S1) - Cost(S2)|/T} \quad (2)$$

where T is a "temperature" parameter. Typically, based on the difference between the scores of the two schedules and the temperature parameter (which, in one embodiment, decreases as the number of iterations increases), the escape function defines a number between 0 and 1. A random number between 0 and 1 is then selected and compared to the value of the escape function. When the random number exceeds the value of the escape function, the schedule with the worse score is accepted.

The escape function defines a number between zero and one using a temperature parameter that is based upon any other additional relevant factors (other than the number of the iteration), such as characteristics of the schedule score (e.g., the magnitude of the schedule score at any given time, the average magnitude of the schedule score over a specified number of iterations). For instance, in other embodiments, the temperature parameter can be a step function that decreases based on the iteration number (rather than a continuous decreasing function, as described above) or a continuous decreasing function that resets to a high temperature after each of a specified number of iterations. In still another embodiment, the temperature parameter is a function that decreases continuously as described above as long as the schedule score continues to improve, but increases to a pre-determined level when the moving average schedule score passes a threshold score level that indicates that the schedule is languishing at a relatively poor score level.

Several characteristics of the above-described technique for escaping local minima should be noted. First, a revised schedule having a worse score than a previous schedule can be accepted as the current schedule, an occurrence which may be necessary to escape local minima. Second, as the difference between the scores of the two schedules increases, it becomes less likely that the schedule with the worse score will be accepted. Thus, radical jumps to much worse schedules are generally avoided, decreasing the likelihood that an acceptable scheduling solution will not be found because of severe disruption of the schedule, and increasing the speed with which a method according to the invention converges to an acceptable scheduling solution. Third, acceptance of the schedule with the worse score becomes less likely later in the iterative process, minimizing the possibility that significant repair of a defective schedule will be undone near the end of the scheduling method.

Though one stochastic technique for escaping local minima is described above, other techniques, such as tabu search, can also be used to escape local minima.

Various embodiments of the invention have been described. The descriptions are intended to be illustrative, not limitative. Thus, it will be apparent to one skilled in the art that certain modifications may be made to the invention as described without departing from the scope of the claims set out below.

For example, though the invention has been described as it applies to scheduling a complex activity, the method and system according to the invention can be used for other applications as well. Generally, a system and method according to the invention can be used to solve any problem which requires the simultaneous satisfaction of a multiplicity of conditions. For example, a system and method according to the invention can be used to produce solutions to any of a variety of optimization problems such as the placement of circuit elements on an integrated circuit, the placement of electronic components on a printed circuit board, the layout of a factory, or the positioning of packages within a loading vessel such as the cargo bay of an airplane or the trailer of a truck.

We claim:

1. A method for scheduling a complex activity that is governed by a set of pre-defined constraints including consumable resource constraints, wherein an unacceptable schedule exists for the activity, the method comprising the steps of:

establishing the unacceptable schedule as a current schedule;

calculating a score for the current schedule;

repairing one or more constraint violations of the current schedule by modifying the current schedule without relaxing the set of pre-defined constraints;

determining a revised schedule from the schedule modification or modifications made by the constraint violation repair or repairs;

calculating a score for the revised schedule;

selecting one of the revised schedule or the current schedule as a new current schedule based upon a comparison of the score of the revised schedule and the score of the current schedule;

repeating, until a predetermined condition is met, the steps of repairing one or more constraint violations of the current schedule, determining a revised schedule, calculating a score for the revised schedule, and selecting one of the revised schedule or the current schedule as the new current schedule; and selecting one of the revised schedules as the final schedule.

2. A method as in claim 1, wherein the step of selecting a new current schedule further comprises the step of selecting as the new current schedule the schedule that has the better score.

3. A method as in claim 1, wherein the step of selecting a new current schedule further comprises the step of occasionally selecting as the new current schedule the schedule that has the worse score.

4. A method as in claim 1, wherein the step of selecting a final schedule further comprises the step of selecting the most recently determined current schedule as the final schedule.

5. A method as in claim 1, further comprising the step of storing the revised schedule having the best score, and wherein the step of selecting a final schedule further comprises the step of selecting the revised schedule having the best score as the final schedule.

6. A method as in claim 1, wherein the score is a function of the relative importance of each constraint and the degree of violation, if any, of each constraint.

7. A method as in claim 1, wherein:

the score is a function of a multiplicity of penalties and weights;

one penalty is associated with each constraint, each penalty representing the degree of violation, if any, of the constraint; and one weight is associated with each constraint, each weight representing the relative importance of the constraint.

8. A method as in claim 1, wherein the constraint violations are repaired so that the repaired constraint violation or violations are less severe than before the repair.

9. A method as in claim 1, wherein the predetermined condition is obtaining a schedule having a score that is better than a predetermined threshold score.

10. A method as in claim 1, wherein:

the activity is a manufacturing operation; and the consumable resources are inventory.

11. A method as in claim 1, wherein:

the activity is a maintenance and repair operation; and the consumable resources are components or materials used to effect the maintenance or repair.

12. A method as in claim 1, wherein the set of pre-defined constraints further includes reusable resource constraints.

13. A system for scheduling a complex activity that is governed by a set of pre-defined constraints including consumable resource constraints, wherein an unacceptable schedule exists for the activity, comprising:

a memory device, wherein:

the memory device is capable of storing an unacceptable initial schedule that is supplied to the system;

the memory device stores information regarding each of the constraints; and the memory device is capable of storing one or more revised schedules produced by the system; and a processing device, wherein:

the processing device is capable of calculating a score for each schedule;

the processing device is capable of repairing one or more constraint violations for each schedule by modifying the schedule without relaxing the set of pre-defined constraints;

the processing device is capable of determining each revised schedule from the schedule modification or modifications made by the constraint violation repair or repairs;

the processing device is capable of selecting one of the revised schedule or the current schedule as a new current schedule based upon a comparison of the score of the revised schedule and the score of the current schedule; and the processing device is capable of selecting one of the schedules as the final schedule determined by the system.

14. A system as in claim 13, wherein:

the memory device is capable of storing the revised schedule having the best score; and the processing device is capable of selecting the revised schedule having the best score as the final schedule.

15. A system as in claim 13, wherein:

the constraint information stored by the memory device includes a description of the constraint, a penalty function, a constraint weight, and a repair method for the constraint;

the score calculated by the processing device for each schedule is a function of the penalty caused by the schedule for each constraint and the weight for each constraint; and the repair performed by the processing device for each constraint violation is performed using the repair method associated with the constraint.

16. A system as in claim 13, further comprising a user input device.

17. A system as in claim 13, further comprising a display device.

18. A system as in claim 13, wherein:

the activity is a manufacturing operation; and the consumable resources are inventory.

19. A system as in claim 13, wherein:

the activity is a maintenance and repair operation; and the consumable resources are components or materials used to effect the maintenance or repair.

20. A computer readable medium encoded with one or more computer programs for enabling scheduling of a complex activity that is governed by a set of pre-defined constraints including consumable resource constraints, comprising:

instructions for establishing an unacceptable initial schedule as a current schedule;

instructions for calculating a score for the current schedule;

instructions for repairing one or more constraint violations of the current schedule by modifying the current schedule without relaxing the set of pre-defined constraints;

instructions for determining a revised schedule from the schedule modification or modifications made by the constraint violation repair or repairs;

instructions for calculating a score for the revised schedule;

instructions for selecting one of the revised schedule or the current schedule as a new current schedule based upon a comparison of the score of the revised schedule and the score of the current schedule;

instructions for causing repetition of, until a predetermined condition is met, the instructions for repairing one or more constraint violations of the current schedule, the instructions for determining a revised schedule, the instructions for calculating a score for the revised schedule, and the instructions for selecting one of the revised schedule or the current schedule as the new current schedule; and instructions for selecting one of the revised schedules as the final schedule.

* * * * *